US012527859B2

(12) United States Patent
Lee et al.

(10) Patent No.: US 12,527,859 B2
(45) Date of Patent: Jan. 20, 2026

(54) VACCINE COMPOSITION FOR CHICKENPOX OR VARICELLA ZOSTER AND METHOD OF USING SAME

(71) Applicants: EUBIOLOGICS CO., LTD., Seoul (KR); POP BIOTECHNOLOGIES, INC., Buffalo, NY (US)

(72) Inventors: Chan Kyu Lee, Chuncheon-si (KR); Jonathan F. Lovell, Niagara Falls (CA); Jee Sun Yun, Chuncheon-si (KR); Seok Kyu Kim, Seoul (KR); Byung Man Lee, Chuncheon-si (KR); Da Hui Ha, Chuncheon-si (KR); Jeong Yoon Lee, Chuncheon-si (KR); Choon Geun Lee, Chuncheon-si (KR); Ye Ram Lee, Chuncheon-si (KR); Wei-Chiao Huang, Buffalo, NY (US); Jemin Han, Ansan-si (KR)

(73) Assignees: EUBIOLOGICS CO., LTD., Seoul (KR); POP BIOTECHNOLOGIES, INC., Buffalo, NY (US)

( * ) Notice: Subject to any disclaimer, the term of this patent is extended or adjusted under 35 U.S.C. 154(b) by 538 days.

(21) Appl. No.: 18/023,580

(22) PCT Filed: Sep. 2, 2021

(86) PCT No.: PCT/KR2021/011841

§ 371 (c)(1),
(2) Date: Feb. 27, 2023

(87) PCT Pub. No.: WO2022/055176

PCT Pub. Date: Mar. 17, 2022

(65) Prior Publication Data

US 2024/0033346 A1 Feb. 1, 2024

(30) Foreign Application Priority Data

Sep. 11, 2020 (KR) ........................ 10-2020-0117051

(51) Int. Cl.
*A61K 39/25* (2006.01)
*A61K 39/00* (2006.01)
*A61P 31/20* (2006.01)

(52) U.S. Cl.
CPC .............. *A61K 39/25* (2013.01); *A61K 39/00* (2013.01); *A61P 31/20* (2018.01); *A61K 2039/55555* (2013.01); *A61K 2039/55572* (2013.01)

(58) Field of Classification Search
CPC .................... A61K 39/25; A61K 39/00; A61K 2039/55555; A61K 2039/55572; A61K 39/12; A61K 2039/55577; A61K 2039/572; A61K 2039/575; A61P 31/20; C12N 2710/16734
See application file for complete search history.

(56) References Cited

U.S. PATENT DOCUMENTS

| | | | | |
|---|---|---|---|---|
| 7,939,084 | B1 | 5/2011 | Hanon et al. | |
| 11,612,650 | B2 | 3/2023 | Yum et al. | |
| 2018/0085473 | A1 | 3/2018 | Lovell et al. | |
| 2019/0328868 | A1 | 10/2019 | Nam et al. | |
| 2021/0290759 | A1 * | 9/2021 | Mu | C12N 15/70 |
| 2023/0110839 | A1 | 4/2023 | Ryu et al. | |
| 2025/0188132 | A1 * | 6/2025 | Ciaramella | A61P 31/12 |

FOREIGN PATENT DOCUMENTS

| | | | |
|---|---|---|---|
| CA | 3 114 658 | A1 | 4/2020 |
| KR | 10-2007-0110413 | A | 11/2007 |
| KR | 10-1357204 | B1 | 2/2014 |
| KR | 10-2019-0117462 | A | 10/2019 |
| KR | 10-2098097 | B1 | 5/2020 |
| KR | 10-2021-0110242 | A | 9/2021 |
| WO | WO 2006/094756 | A2 | 9/2006 |

(Continued)

OTHER PUBLICATIONS

Attallah C, Etcheverrigaray M, Kratje R, Oggero M. A highly efficient modified human serum albumin signal peptide to secrete proteins in cells derived from different mammalian species. Protein Expr Purif. Apr. 2017;132:27-33. Epub Jan. 10, 2017. (Year: 2017).*
Haumont M, Jacquet A, Massaer M, Deleersnyder V, Mazzu P, Bollen A, Jacobs P. Purification, characterization and immunogenicity of recombinant varicella-zoster virus glycoprotein gE secreted by Chinese hamster ovary cells. Virus Res. Feb. 1996;40(2):199-204. (Year: 1996).*

(Continued)

*Primary Examiner* — Rachel B Gill

(74) *Attorney, Agent, or Firm* — Birch, Stewart, Kolasch & Birch, LLP

(57) ABSTRACT

Provided are a vaccine composition for Varicella Zoster virus (VZV) including a glycoprotein E (gE) antigen of VZV and monophosphoryl lipid A (MLA), and a method of using the same. The vaccine composition according to an aspect of the invention may significantly improve a production yield by including the gE antigen having an optimized signal peptide sequence, may enhance immunogenicity by including MLA, and may further enhance the immunogenicity enhanced by MLA by further adding saponin such as QS-21, and may be prepared in a form of CoPoP liposomes so that vaccine antigens may be presented on the surface of the liposomes for better absorption by antigen-presenting cells, and vaccine efficacy may be maximized by inclusion of the vaccine antigens and immune adjuvants in a formulation. Therefore, the vaccine composition may be useful as an alternative to current vaccines in the art for prevention or treatment of VZV infection.

19 Claims, 8 Drawing Sheets

Specification includes a Sequence Listing.

(56) References Cited

FOREIGN PATENT DOCUMENTS

| | | | |
|---|---|---|---|
| WO | WO 2016/168817 A1 | 10/2016 |
| WO | WO 2018/198085 A1 | 11/2018 |

OTHER PUBLICATIONS

Thomsson E, Persson L, Grahn A, Snäll J, Ekblad M, Brunhage E, Svensson F, Jern C, Hansson GC, Bäckström M, Bergström T. Recombinant glycoprotein E produced in mammalian cells in large-scale as an antigen for varicella-zoster-virus serology. J Virol Methods. Jul. 2011;175(1):53-9. Epub Apr. 22, 2011. (Year: 2011).*

Dendouga et al., "Cell-mediated immune responses to a varicella-zoster virus glycoprotein E vaccine using both a TLR agonist and QS21 in mice", Vaccine, vol. 30, 2012, pp. 3126-3135 (total 11 pages).

GenBank: AEW88764.1, membrane glycoprotein E [Human alphaherpesvirus 3], Feb. 3, 2012, total 3 pages.

International Search Report (PCT/ISA/210) issued in PCT/KR2021/011841, dated Dec. 16, 2021.

Shao et al., "Functionalization of cobalt porphyrin-phospholipid bilayers with his-tagged ligands and antigens", Nature Chemistry, vol. 7, May 2015, pp. 438-446 (total 10 pages).

Written Opinion of the International Searching Authority (PCT/ISA/237) issued in PCT/KR2021/011841, dated Dec. 16, 2021.

"EcML," Eubiologics [Online], 2013, 6 pages total, with English translation.

Extended European Search Report for European Application No. 21867042.0, dated Sep. 23, 2024.

Federizon et al., "Immunogenicity of the Lyme disease antigen OspA, particleized by cobalt porphyrin-phospholipid liposomes," Vaccine, vol. 38, No. 4, 2020, pp. 942-950.

Monslow et al., "Immunogenicity generated by mRNA vaccine encoding VZV gE antigen is comparable to adjuvanted subunit vaccine and better than live attenuated vaccine in nonhuman primates," Vaccine, vol. 38, 2020, pp. 5793-5802.

Siedler et al., "Background paper to the decision to recommend the vaccination with the inactivated herpes zoster subunit vaccine," Bundesgesundheitsbl, vol. 62, 2019, pp. 352-376.

Stadtmauer et al., "A phase 1/2 study of an adjuvanted varicella-zoster virus subunit vaccine in autologous hematopoietic cell transplant recipients," Blood, vol. 124, No. 19, Nov. 6, 2014, pp. 2921-2929.

* cited by examiner

SEQUENCE LISTING

<160> NUMBER OF SEQ ID NOS: 24

<210> SEQ ID NO 1
<211> LENGTH: 526
<212> TYPE: PRT
<213> ORGANISM: Artificial
<220> FEATURE:
<223> OTHER INFORMATION: gEs

<400> SEQUENCE: 1

Met Lys Trp Val Thr Phe Ile Ser Leu Leu Phe Leu Phe Ser Ser Ala
1 5 10 15

Tyr Ser Ser Val Leu Arg Tyr Asp Asp Phe His Thr Asp Glu Asp Lys
20 25 30

Leu Asp Thr Asn Ser Val Tyr Glu Pro Tyr Tyr His Ser Asp His Ala
35 40 45

Glu Ser Ser Trp Val Asn Arg Gly Glu Ser Ser Arg Lys Ala Tyr Asp
50 55 60

His Asn Ser Pro Tyr Ile Trp Pro Arg Asn Asp Tyr Asp Gly Phe Leu
65 70 75 80

Glu Asn Ala His Glu His His Gly Val Tyr Asn Gln Gly Arg Gly Ile
85 90 95

Asp Ser Gly Glu Arg Leu Met Gln Pro Thr Gln Met Ser Ala Gln Glu
100 105 110

Asp Leu Gly Asp Asp Thr Gly Ile His Val Ile Pro Thr Leu Asn Gly
115 120 125

Asp Asp Arg His Lys Ile Val Asn Val Asp Gln Arg Gln Tyr Gly Asp
130 135 140

Val Phe Lys Gly Asp Leu Asn Pro Lys Pro Gln Gly Gln Arg Leu Ile
145 150 155 160

Glu Val Ser Val Glu Glu Asn His Pro Phe Thr Leu Arg Ala Pro Ile
165 170 175

Gln Arg Ile Tyr Gly Val Arg Tyr Thr Glu Thr Trp Ser Phe Leu Pro

```
            180                 185                 190

Ser Leu Thr Cys Thr Gly Asp Ala Ala Pro Ala Ile Gln His Ile Cys
        195                 200                 205

Leu Lys His Thr Thr Cys Phe Gln Asp Val Val Val Asp Val Asp Cys
    210                 215                 220

Ala Glu Asn Thr Lys Glu Asp Gln Leu Ala Glu Ile Ser Tyr Arg Phe
225                 230                 235                 240

Gln Gly Lys Lys Glu Ala Asp Gln Pro Trp Ile Val Val Asn Thr Ser
                245                 250                 255

Thr Leu Phe Asp Glu Leu Glu Leu Asp Pro Pro Glu Ile Glu Pro Gly
            260                 265                 270

Val Leu Lys Val Leu Arg Thr Glu Lys Gln Tyr Leu Gly Val Tyr Ile
        275                 280                 285

Trp Asn Met Arg Gly Ser Asp Gly Thr Ser Thr Tyr Ala Thr Phe Leu
    290                 295                 300

Val Thr Trp Lys Gly Asp Glu Lys Thr Arg Asn Pro Thr Pro Ala Val
305                 310                 315                 320

Thr Pro Gln Pro Arg Gly Ala Glu Phe His Met Trp Asn Tyr His Ser
                325                 330                 335

His Val Phe Ser Val Gly Asp Thr Phe Ser Leu Ala Met His Leu Gln
            340                 345                 350

Tyr Lys Ile His Glu Ala Pro Phe Asp Leu Leu Leu Glu Trp Leu Tyr
        355                 360                 365

Val Pro Ile Asp Pro Thr Cys Gln Pro Met Arg Leu Tyr Ser Thr Cys
    370                 375                 380

Leu Tyr His Pro Asn Ala Pro Gln Cys Leu Ser His Met Asn Ser Gly
385                 390                 395                 400

Cys Thr Phe Thr Ser Pro His Leu Ala Gln Arg Val Ala Ser Thr Val
                405                 410                 415

Tyr Gln Asn Cys Glu His Ala Asp Asn Tyr Thr Ala Tyr Cys Leu Gly
            420                 425                 430

Ile Ser His Met Glu Pro Ser Phe Gly Leu Ile Leu His Asp Gly Gly
        435                 440                 445

Thr Thr Leu Lys Phe Val Asp Thr Pro Glu Ser Leu Ser Gly Leu Tyr
    450                 455                 460

Val Phe Val Val Tyr Phe Asn Gly His Val Glu Ala Val Ala Tyr Thr
465                 470                 475                 480

Val Val Ser Thr Val Asp His Phe Val Asn Ala Ile Glu Glu Arg Gly
                485                 490                 495

Phe Pro Pro Thr Ala Gly Gln Pro Pro Ala Thr Thr Lys Pro Lys Glu
            500                 505                 510

Ile Thr Pro Val Asn Pro Gly Thr Ser Pro Leu Ile Arg Tyr
        515                 520                 525


<210> SEQ ID NO 2
<211> LENGTH: 534
<212> TYPE: PRT
<213> ORGANISM: Artificial
<220> FEATURE:
<223> OTHER INFORMATION: gEt

<400> SEQUENCE: 2

Met Lys Trp Val Thr Phe Ile Ser Leu Leu Phe Leu Phe Ser Ser Ala
1               5                   10                  15

Tyr Ser Ser Val Leu Arg Tyr Asp Asp Phe His Thr Asp Glu Asp Lys
```

```
            20                  25                  30

Leu Asp Thr Asn Ser Val Tyr Glu Pro Tyr Tyr His Ser Asp His Ala
        35                  40                  45

Glu Ser Ser Trp Val Asn Arg Gly Glu Ser Ser Arg Lys Ala Tyr Asp
    50                  55                  60

His Asn Ser Pro Tyr Ile Trp Pro Arg Asn Asp Tyr Asp Gly Phe Leu
65                  70                  75                  80

Glu Asn Ala His Glu His His Gly Val Tyr Asn Gln Gly Arg Gly Ile
                85                  90                  95

Asp Ser Gly Glu Arg Leu Met Gln Pro Thr Gln Met Ser Ala Gln Glu
            100                 105                 110

Asp Leu Gly Asp Asp Thr Gly Ile His Val Ile Pro Thr Leu Asn Gly
        115                 120                 125

Asp Asp Arg His Lys Ile Val Asn Val Asp Gln Arg Gln Tyr Gly Asp
    130                 135                 140

Val Phe Lys Gly Asp Leu Asn Pro Lys Pro Gln Gly Gln Arg Leu Ile
145                 150                 155                 160

Glu Val Ser Val Glu Glu Asn His Pro Phe Thr Leu Arg Ala Pro Ile
                165                 170                 175

Gln Arg Ile Tyr Gly Val Arg Tyr Thr Glu Thr Trp Ser Phe Leu Pro
            180                 185                 190

Ser Leu Thr Cys Thr Gly Asp Ala Ala Pro Ala Ile Gln His Ile Cys
        195                 200                 205

Leu Lys His Thr Thr Cys Phe Gln Asp Val Val Val Asp Val Asp Cys
    210                 215                 220

Ala Glu Asn Thr Lys Glu Asp Gln Leu Ala Glu Ile Ser Tyr Arg Phe
225                 230                 235                 240

Gln Gly Lys Lys Glu Ala Asp Gln Pro Trp Ile Val Val Asn Thr Ser
                245                 250                 255

Thr Leu Phe Asp Glu Leu Glu Leu Asp Pro Pro Glu Ile Glu Pro Gly
            260                 265                 270

Val Leu Lys Val Leu Arg Thr Glu Lys Gln Tyr Leu Gly Val Tyr Ile
        275                 280                 285

Trp Asn Met Arg Gly Ser Asp Gly Thr Ser Thr Tyr Ala Thr Phe Leu
    290                 295                 300

Val Thr Trp Lys Gly Asp Glu Lys Thr Arg Asn Pro Thr Pro Ala Val
305                 310                 315                 320

Thr Pro Gln Pro Arg Gly Ala Glu Phe His Met Trp Asn Tyr His Ser
                325                 330                 335

His Val Phe Ser Val Gly Asp Thr Phe Ser Leu Ala Met His Leu Gln
            340                 345                 350

Tyr Lys Ile His Glu Ala Pro Phe Asp Leu Leu Leu Glu Trp Leu Tyr
        355                 360                 365

Val Pro Ile Asp Pro Thr Cys Gln Pro Met Arg Leu Tyr Ser Thr Cys
    370                 375                 380

Leu Tyr His Pro Asn Ala Pro Gln Cys Leu Ser His Met Asn Ser Gly
385                 390                 395                 400

Cys Thr Phe Thr Ser Pro His Leu Ala Gln Arg Val Ala Ser Thr Val
                405                 410                 415

Tyr Gln Asn Cys Glu His Ala Asp Asn Tyr Thr Ala Tyr Cys Leu Gly
            420                 425                 430

Ile Ser His Met Glu Pro Ser Phe Gly Leu Ile Leu His Asp Gly Gly
        435                 440                 445
```

Thr Thr Leu Lys Phe Val Asp Thr Pro Glu Ser Leu Ser Gly Leu Tyr
    450                 455                 460

Val Phe Val Val Tyr Phe Asn Gly His Val Glu Ala Val Ala Tyr Thr
465                 470                 475                 480

Val Val Ser Thr Val Asp His Phe Val Asn Ala Ile Glu Glu Arg Gly
                485                 490                 495

Phe Pro Pro Thr Ala Gly Gln Pro Pro Ala Thr Thr Lys Pro Lys Glu
            500                 505                 510

Ile Thr Pro Val Asn Pro Gly Thr Ser Pro Leu Ile Arg Tyr Ala Ala
        515                 520                 525

Trp Thr Gly Gly Leu Ala
    530

<210> SEQ ID NO 3
<211> LENGTH: 1581
<212> TYPE: DNA
<213> ORGANISM: Artificial
<220> FEATURE:
<223> OTHER INFORMATION: gEs

<400> SEQUENCE: 3
atgaagtggg tgacatttat ctctctgctt ttcctgttca gcagcgccta cagtagcgtg 60
ctgcgctacg acgatttcca catcgacgag gataagctgg acaccaatag cgtgtatgag 120
ccttactatc actctgatca tgccgagtcc agctgggtga acaggggcga gtcttcccgg 180
aaggcttacg accacaactc tccctatatc tggcccagga atgactacga tggctttctg 240
gagaacgccc atgagcacca tggcgtgtat aatcagggcc ggggcatcga ctctggcgag 300
agactgatgc agcctacaca gatgtccgct caggaggatc tgggcgacga tacaggcatc 360
cacgtgatcc caaccctgaa tggcgacgat cgccataaga tcgtgaacgt ggatcagagg 420
cagtacggcg acgtgttcaa gggcgatctg aatccaaagc cccagggcca gcggctgatc 480
gaggtgtccg tggaggagaa ccatccattc accctgagag cccccatcca gcgcatctac 540
ggcgtgaggt ataccgagac atggtccttt ctgcctagcc tgacctgcac aggcgacgct 600
gctccagcta tccagcacat ctgcctgaag cataccacat gttttcagga cgtggtggtg 660
gacgtggatt gtgccgagaa tacaaaggag gatcagctgg ctgagatcag ctacagattc 720
cagggcaaga aggaggccga tcagccatgg atcgtggtga acacctctac actgtttgac 780
gagctggagc tggacccccc cgagatcgag ccaggcgtgc tgaaggtgct gcgcaccgag 840
aagcagtacc tgggcgtgta tatctggaac atgaggggct ctgacggcac ctccacatac 900
gctaccttcc tggtgacatg gaagggcgat gagaagaccc ggaatccaac accagctgtg 960
acccctcagc caagaggcgc tgagtttcac atgtggaact atcacagcca cgtgttctcc 1020
gtgggcgaca ccttttccct ggccatgcac ctgcagtaca agatccatga ggctccattc 1080
gacctgctgc tggagtggct gtatgtgccc atcgatccta catgccagcc catgcggctg 1140
tacagcacct gtctgtatca cccaaatgcc ccccagtgcc tgtcccatat gaacagcggc 1200
tgtaccttta catccccaca cctggcccag agagtggcct ccacagtgta ccagaactgc 1260
gagcatgccg acaattacac cgcttattgt ctgggcatct ctcacatgga gccctccttc 1320
ggcctgatcc tgcatgacgg cggcaccaca ctgaagtttg tggatacacc tgagagcctg 1380
tctggcctgt acgtgttcgt ggtgtacttc aacggccacg tggaggccgt ggcttataca 1440
gtggtgtcta ccgtggatca tttcgtgaac gctatcgagg agaggggatt tccaccaacc 1500
gctggacagc ctccagctac cacaaagccc aaggagatca cacctgtgaa cccaggcacc 1560
tcccctctga ttcgttattg a 1581

<210> SEQ ID NO 4
<211> LENGTH: 1605
<212> TYPE: DNA
<213> ORGANISM: Artificial
<220> FEATURE:
<223> OTHER INFORMATION: gEt

<400> SEQUENCE: 4
atgaagtggg tgacatttat ctctctgctt ttcctgttca gcagcgccta cagtagcgtg 60
ctgcgctacg acgatttcca catcgacgag gataagctgg acaccaatag cgtgtatgag 120
ccttactatc actctgatca tgccgagtcc agctgggtga acaggggcga gtcttcccgg 180
aaggcttacg accacaactc tccctatatc tggcccagga atgactacga tggctttctg 240
gagaacgccc atgagcacca tggcgtgtat aatcagggcc ggggcatcga ctctggcgag 300
agactgatgc agcctacaca gatgtccgct caggaggatc tgggcgacga tacaggcatc 360
cacgtgatcc caaccctgaa tggcgacgat cgccataaga tcgtgaacgt ggatcagagg 420
cagtacggcg acgtgttcaa gggcgatctg aatccaaagc cccagggcca gcggctgatc 480
gaggtgtccg tggaggagaa ccatccattc accctgagag cccccatcca gcgcatctac 540
ggcgtgaggt ataccgagac atggtccttt ctgcctagcc tgacctgcac aggcgacgct 600
gctccagcta tccagcacat ctgcctgaag cataccacat gttttcagga cgtggtggtg 660
gacgtggatt gtgccgagaa tacaaaggag gatcagctgg ctgagatcag ctacagattc 720
cagggcaaga aggaggccga tcagccatgg atcgtggtga acacctctac actgtttgac 780
gagctggagc tggacccccc cgagatcgag ccaggcgtgc tgaaggtgct gcgcaccgag 840
aagcagtacc tgggcgtgta tatctggaac atgaggggct ctgacggcac ctccacatac 900
gctaccttcc tggtgacatg gaagggcgat gagaagaccc ggaatccaac accagctgtg 960
acccctcagc caagaggcgc tgagtttcac atgtggaact atcacagcca cgtgttctcc 1020
gtgggcgaca ccttttccct ggccatgcac ctgcagtaca agatccatga ggctccattc 1080
gacctgctgc tggagtggct gtatgtgccc atcgatccta catgccagcc catgcggctg 1140
tacagcacct gtctgtatca cccaaatgcc ccccagtgcc tgtcccatat gaacagcggc 1200
tgtaccttta catccccaca cctggcccag agagtggcct ccacagtgta ccagaactgc 1260
gagcatgccg acaattacac cgcttattgt ctgggcatct ctcacatgga gccctccttc 1320
ggcctgatcc tgcatgacgg cggcaccaca ctgaagtttg tggatacacc tgagagcctg 1380
tctggcctgt acgtgttcgt ggtgtacttc aacggccacg tggaggccgt ggcttataca 1440
gtggtgtcta ccgtggatca tttcgtgaac gctatcgagg agaggggatt tccaccaacc 1500
gctggacagc ctccagctac cacaaagccc aaggagatca cacctgtgaa cccaggcacc 1560
tcccctctga ttcgttatgc tgcttggaca gggggtctgg catga 1605

<210> SEQ ID NO 5
<211> LENGTH: 623
<212> TYPE: PRT
<213> ORGANISM: Human herpesvirus 3

<400> SEQUENCE: 5

Met Gly Thr Val Asn Lys Pro Val Val Gly Val Leu Met Gly Phe Gly
1 5 10 15

-continued

```
Ile Ile Thr Gly Thr Leu Arg Ile Thr Asn Pro Val Arg Ala Ser Val
            20                  25                  30

Leu Arg Tyr Asp Asp Phe His Thr Asp Glu Asp Lys Leu Asp Thr Asn
        35                  40                  45

Ser Val Tyr Glu Pro Tyr Tyr His Ser Asp His Ala Glu Ser Ser Trp
    50                  55                  60

Val Asn Arg Gly Glu Ser Ser Arg Lys Ala Tyr Asp His Asn Ser Pro
65                  70                  75                  80

Tyr Ile Trp Pro Arg Asn Asp Tyr Asp Gly Phe Leu Glu Asn Ala His
                85                  90                  95

Glu His His Gly Val Tyr Asn Gln Gly Arg Gly Ile Asp Ser Gly Glu
            100                 105                 110

Arg Leu Met Gln Pro Thr Gln Met Ser Ala Gln Glu Asp Leu Gly Asp
        115                 120                 125

Asp Thr Gly Ile His Val Ile Pro Thr Leu Asn Gly Asp Asp Arg His
    130                 135                 140

Lys Ile Val Asn Val Asp Gln Arg Gln Tyr Gly Asp Val Phe Lys Gly
145                 150                 155                 160

Asp Leu Asn Pro Lys Pro Gln Gly Gln Arg Leu Ile Glu Val Ser Val
                165                 170                 175

Glu Glu Asn His Pro Phe Thr Leu Arg Ala Pro Ile Gln Arg Ile Tyr
            180                 185                 190

Gly Val Arg Tyr Thr Glu Thr Trp Ser Phe Leu Pro Ser Leu Thr Cys
        195                 200                 205

Thr Gly Asp Ala Ala Pro Ala Ile Gln His Ile Cys Leu Lys His Thr
    210                 215                 220

Thr Cys Phe Gln Asp Val Val Val Asp Val Asp Cys Ala Glu Asn Thr
225                 230                 235                 240

Lys Glu Asp Gln Leu Ala Glu Ile Ser Tyr Arg Phe Gln Gly Lys Lys
                245                 250                 255

Glu Ala Asp Gln Pro Trp Ile Val Val Asn Thr Ser Thr Leu Phe Asp
            260                 265                 270

Glu Leu Glu Leu Asp Pro Pro Glu Ile Glu Pro Gly Val Leu Lys Val
        275                 280                 285

Leu Arg Thr Glu Lys Gln Tyr Leu Gly Val Tyr Ile Trp Asn Met Arg
    290                 295                 300

Gly Ser Asp Gly Thr Ser Thr Tyr Ala Thr Phe Leu Val Thr Trp Lys
305                 310                 315                 320

Gly Asp Glu Lys Thr Arg Asn Pro Thr Pro Ala Val Thr Pro Gln Pro
                325                 330                 335

Arg Gly Ala Glu Phe His Met Trp Asn Tyr His Ser His Val Phe Ser
            340                 345                 350

Val Gly Asp Thr Phe Ser Leu Ala Met His Leu Gln Tyr Lys Ile His
        355                 360                 365

Glu Ala Pro Phe Asp Leu Leu Leu Glu Trp Leu Tyr Val Pro Ile Asp
    370                 375                 380

Pro Thr Cys Gln Pro Met Arg Leu Tyr Ser Thr Cys Leu Tyr His Pro
385                 390                 395                 400

Asn Ala Pro Gln Cys Leu Ser His Met Asn Ser Gly Cys Thr Phe Thr
                405                 410                 415

Ser Pro His Leu Ala Gln Arg Val Ala Ser Thr Val Tyr Gln Asn Cys
            420                 425                 430

Glu His Ala Asp Asn Tyr Thr Ala Tyr Cys Leu Gly Ile Ser His Met
```

```
        435                 440                 445

Glu Pro Ser Phe Gly Leu Ile Leu His Asp Gly Gly Thr Thr Leu Lys
    450                 455                 460

Phe Val Asp Thr Pro Glu Ser Leu Ser Gly Leu Tyr Val Phe Val Val
465                 470                 475                 480

Tyr Phe Asn Gly His Val Glu Ala Val Ala Tyr Thr Val Val Ser Thr
                485                 490                 495

Val Asp His Phe Val Asn Ala Ile Glu Glu Arg Gly Phe Pro Pro Thr
            500                 505                 510

Ala Gly Gln Pro Pro Ala Thr Thr Lys Pro Lys Glu Ile Thr Pro Val
        515                 520                 525

Asn Pro Gly Thr Ser Pro Leu Ile Arg Tyr Ala Ala Trp Thr Gly Gly
    530                 535                 540

Leu Ala Ala Val Val Leu Leu Cys Leu Val Ile Phe Leu Ile Cys Thr
545                 550                 555                 560

Ala Lys Arg Met Arg Val Lys Ala Tyr Arg Val Asp Lys Ser Pro Tyr
                565                 570                 575

Asn Gln Ser Met Tyr Tyr Ala Gly Leu Pro Val Asp Asp Phe Glu Asp
            580                 585                 590

Ser Glu Ser Thr Asp Thr Glu Glu Glu Phe Gly Asn Ala Ile Gly Gly
        595                 600                 605

Ser His Gly Gly Ser Ser Tyr Thr Val Tyr Ile Asp Lys Thr Arg
    610                 615                 620
```

<210> SEQ ID NO 6
<211> LENGTH: 18
<212> TYPE: PRT
<213> ORGANISM: Artificial
<220> FEATURE:
<223> OTHER INFORMATION: mutant signal peptide

<400> SEQUENCE: 6

```
Met Lys Trp Val Thr Phe Ile Ser Leu Leu Phe Leu Phe Ser Ser Ala
1               5                   10                  15

Tyr Ser
```

<210> SEQ ID NO 7
<211> LENGTH: 1659
<212> TYPE: DNA
<213> ORGANISM: Artificial
<220> FEATURE:
<223> OTHER INFORMATION: codon optimized nucleic acid sequence encoding 1-546 amino acids of gE antigen with 6 histidine

<400> SEQUENCE: 7

```
atgggaactg tgaacaagcc cgtcgtgggg gtcctgatgg gtttcggtat tattactgga     60

actctgcgta ttacaaatcc tgtccgtgcc agcgtgctgc gctacgacga tttccacatc    120

gacgaggata agctggacac caatagcgtg tatgagcctt actatcactc tgatcatgcc    180

gagtccagct gggtgaacag gggcgagtct tcccggaagg cttacgacca caactctccc    240

tatatctggc ccaggaatga ctacgatggc tttctggaga acgcccatga gcaccatggc    300

gtgtataatc agggccgggg catcgactct ggcgagagac tgatgcagcc tacacagatg    360

tccgctcagg aggatctggg cgacgataca ggcatccacg tgatcccaac cctgaatggc    420

gacgatcgcc ataagatcgt gaacgtggat cagaggcagt acggcgacgt gttcaagggc    480

gatctgaatc caaagcccca gggccagcgg ctgatcgagg tgtccgtgga ggagaaccat    540
```

-continued

```
ccattcaccc tgagagcccc catccagcgc atctacggcg tgaggtatac cgagacatgg    600

tcctttctgc ctagcctgac ctgcacaggc gacgctgctc cagctatcca gcacatctgc    660

ctgaagcata ccacatgttt tcaggacgtg gtggtggacg tggattgtgc cgagaataca    720

aaggaggatc agctggctga gatcagctac agattccagg gcaagaagga ggccgatcag    780

ccatggatcg tggtgaacac ctctacactg tttgacgagc tggagctgga ccccccccgag    840

atcgagccag gcgtgctgaa ggtgctgcgc accgagaagc agtacctggg cgtgtatatc    900

tggaacatga ggggctctga cggcacctcc acatacgcta ccttcctggt gacatggaag    960

ggcgatgaga agacccggaa tccaacacca gctgtgaccc ctcagccaag aggcgctgag   1020

tttcacatgt ggaactatca cagccacgtg ttctccgtgg gcgacacctt ttccctggcc   1080

atgcacctgc agtacaagat ccatgaggct ccattcgacc tgctgctgga gtggctgtat   1140

gtgcccatcg atcctacatg ccagcccatg cggctgtaca gcacctgtct gtatcaccca   1200

aatgcccccc agtgcctgtc ccatatgaac agcggctgta cctttacatc ccccacacctg   1260

gcccagagag tggcctccac agtgtaccag aactgcgagc atgccgacaa ttacaccgct   1320

tattgtctgg gcatctctca catggagccc tccttcggcc tgatcctgca tgacggcggc   1380

accacactga agtttgtgga tacacctgag agcctgtctg gcctgtacgt gttcgtggtg   1440

tacttcaacg gccacgtgga ggccgtggct tatacagtgg tgtctaccgt ggatcatttc   1500

gtgaacgcta tcgaggagag gggatttcca ccaaccgctg gacagcctcc agctaccaca   1560

aagcccaagg agatcacacc tgtgaaccca ggcacctccc ctctgattcg ttatgctgct   1620

tggacagggg gtctggcaca ccaccaccac caccactga                          1659
```

```
<210> SEQ ID NO 8
<211> LENGTH: 31
<212> TYPE: DNA
<213> ORGANISM: Artificial
<220> FEATURE:
<223> OTHER INFORMATION: forward primer 1

<400> SEQUENCE: 8

gctagcgccg ccaccatggg aactgtgaac a                                    31


<210> SEQ ID NO 9
<211> LENGTH: 30
<212> TYPE: DNA
<213> ORGANISM: Artificial
<220> FEATURE:
<223> OTHER INFORMATION: reverse primer 1

<400> SEQUENCE: 9

gcggccgctt atcagtggtg gtggtggtgg                                      30


<210> SEQ ID NO 10
<211> LENGTH: 33
<212> TYPE: DNA
<213> ORGANISM: Artificial
<220> FEATURE:
<223> OTHER INFORMATION: reverse primer 2

<400> SEQUENCE: 10

gaattctcat tatgccagac cccctgtcca agc                                  33


<210> SEQ ID NO 11
<211> LENGTH: 30
<212> TYPE: DNA
<213> ORGANISM: Artificial
```

<220> FEATURE:
<223> OTHER INFORMATION: reverse primer 3

<400> SEQUENCE: 11
gtaccggatc agaggggagg tgcctgggtt 30

<210> SEQ ID NO 12
<211> LENGTH: 30
<212> TYPE: DNA
<213> ORGANISM: Artificial
<220> FEATURE:
<223> OTHER INFORMATION: forward primer 1

<400> SEQUENCE: 12
gctagcgccg ccaccatggg aactgtgaac 30

<210> SEQ ID NO 13
<211> LENGTH: 49
<212> TYPE: DNA
<213> ORGANISM: Artificial
<220> FEATURE:
<223> OTHER INFORMATION: reverse primer 4

<400> SEQUENCE: 13
gcggccgctc aatggtgatg gtgatgatga taacgaatca gaggggagg 49

<210> SEQ ID NO 14
<211> LENGTH: 21
<212> TYPE: DNA
<213> ORGANISM: Artificial
<220> FEATURE:
<223> OTHER INFORMATION: forward primer 3

<400> SEQUENCE: 14
agcgtgctgc gctacgacga t 21

<210> SEQ ID NO 15
<211> LENGTH: 90
<212> TYPE: DNA
<213> ORGANISM: Artificial
<220> FEATURE:
<223> OTHER INFORMATION: forward primer 4

<400> SEQUENCE: 15
aagcttgccg ccaccatgaa gtgggtgaca tttatctctc tgcttttcct gttcagcagc 60
gcctacagta gcgtgctgcg ctacgacgat 90

<210> SEQ ID NO 16
<211> LENGTH: 30
<212> TYPE: DNA
<213> ORGANISM: Artificial
<220> FEATURE:
<223> OTHER INFORMATION: forward primer 5

<400> SEQUENCE: 16
aagcttgccg ccaccatgaa gtgggtgaca 30

<210> SEQ ID NO 17
<211> LENGTH: 33
<212> TYPE: DNA
<213> ORGANISM: Artificial
<220> FEATURE:
<223> OTHER INFORMATION: reverse primer 5

<400> SEQUENCE: 17
gaattctcat tatgccagac cccctgtcca agc 33

<210> SEQ ID NO 18
<211> LENGTH: 33
<212> TYPE: DNA
<213> ORGANISM: Artificial
<220> FEATURE:
<223> OTHER INFORMATION: reverse primer 6

<400> SEQUENCE: 18
gaattctcat taataacgaa tcagagggga ggt 33

<210> SEQ ID NO 19
<211> LENGTH: 21
<212> TYPE: DNA
<213> ORGANISM: Artificial
<220> FEATURE:
<223> OTHER INFORMATION: CMV-F1 (vector) primer

<400> SEQUENCE: 19
cgcaaatggg cggtaggcgt g 21

<210> SEQ ID NO 20
<211> LENGTH: 21
<212> TYPE: DNA
<213> ORGANISM: Artificial
<220> FEATURE:
<223> OTHER INFORMATION: VZV-F2-403 primer

<400> SEQUENCE: 20
caggcatcca cgtgatccca a 21

<210> SEQ ID NO 21
<211> LENGTH: 21
<212> TYPE: DNA
<213> ORGANISM: Artificial
<220> FEATURE:
<223> OTHER INFORMATION: VZV-F3-1053 primer

<400> SEQUENCE: 21
tatcacagcc acgtgttctc c 21

<210> SEQ ID NO 22
<211> LENGTH: 18
<212> TYPE: DNA
<213> ORGANISM: Artificial
<220> FEATURE:
<223> OTHER INFORMATION: VZV-R1~600 primer

<400> SEQUENCE: 22
ccatgtctcg gtatacct 18

<210> SEQ ID NO 23
<211> LENGTH: 17
<212> TYPE: DNA
<213> ORGANISM: Artificial
<220> FEATURE:
<223> OTHER INFORMATION: VZV-R2~1200 primer

<400> SEQUENCE: 23
tgggtgatac agacagg 17

<210> SEQ ID NO 24
<211> LENGTH: 18
<212> TYPE: DNA
<213> ORGANISM: Artificial

-continued

```
<220> FEATURE:
<223> OTHER INFORMATION: VZV-R3 plus 150 (vector) primer

<400> SEQUENCE: 24

agagtgccag ccctggga                                          18
```

VACCINE COMPOSITION FOR CHICKENPOX OR VARICELLA ZOSTER AND METHOD OF USING SAME

CROSS REFERENCE TO RELATED APPLICATIONS

This application is the National Phase of PCT International Application No. PCT/KR2021/011841, filed on Sep. 2, 2021, which claims priority under 35 U.S.C. § 119(a) to Patent Application No. 10-2020-0117051, filed in the Republic of Korea on Sep. 11, 2020, all of which are hereby expressly incorporated by reference into the present application.

REFERENCE TO ELECTRONIC SEQUENCE LISTING

The application contains a Sequence Listing which has been submitted electronically in .txt format and is hereby incorporated by reference in its entirety. Said .txt copy, created on Aug. 8, 2023, is named "2023-08-09_Sequence-Listing_1183-0157PUS1.txt" and is 24,798 bytes in size. The sequence listing contained in this .txt file is part of the specification and is hereby incorporated by reference herein in its entirety.

TECHNICAL FIELD

The present disclosure relates to a chicken pox or herpes zoster vaccine composition comprising glycoprotein E antigens of a Varicella Zoster virus (VZV) and monophosphoryl lipid A (MLA) and a method of using the same.

BACKGROUND ART

With concerns about vaccine safety growing, the development of subunit antigens is increasing because the structure and components thereof are defined and safe compared to those of live or killed vaccines. However, subunit antigens show low vaccine efficacy, while they have higher safety than live or killed vaccines, and therefore, immune adjuvants are increasingly used in the vaccine development to enhance vaccine efficacy of subunit antigens. So far, immune adjuvants have been mainly used in the development of human vaccines to enhance immunogenicity of vaccines, but as specific mechanisms of action have been revealed and immunotherapy to treat diseases by controlling the immune system of the body has drawn attention, applications of immune adjuvants are expanding to areas such as anticancer therapy and treatment of autoimmune disorders.

Herpes zoster is caused by the reactivation of the Varicella Zoster Virus (VZV) which has caused chicken pox and then remained dormant in the ganglion until it is reactivated when the immunity is weakened. About 60% of all patients are over 50 years of age, and herpes zoster occurs in people whose immune systems are weakened or who have been under heavy stress, causing rashes and blisters, and even after the skin lesions are healed, a hard-to-control complication called postherpetic neuralgia (PHN) in which very severe pain remains for months or years, follows. Each year, 10 million people worldwide and 500,000 people in the United States are affected by the virus, and about 10% to 20% develop herpes zoster due to reactivation of VZV.

Zostavax by Merck Company, the first herpes zoster vaccine developed, has not been highly effective in the prevention of zoster herpes, and as the vaccine uses live attenuated VZVs as its main ingredient, has not been administered to patients with immunodeficiency, women who are or might be pregnant. In addition, due to low productivity, its supply has not been sufficient to meet the demand, and the price is high.

Therefore, it is necessary to develop a new herpes zoster vaccine that may ensure safety while having high productivity and excellent efficacy.

DESCRIPTION OF EMBODIMENTS

Technical Problem

Provided is a vaccine composition comprising a glycoprotein E (gE) antigen of Varicella Zoster virus (VZV) and monophosphoryl lipid A (MLA).

Provided is a method of preparing the vaccine composition.

Solution to Problem

An aspect provides a vaccine composition comprising a glycoprotein E (gE) antigen of Varicella Zoster virus (VZV), and monophosphoryl lipid A (MLA), the gE antigen comprising an amino acid sequence of SEQ ID NO: 1.

The term "Varicella Zoster virus (VZV)", as used herein, refers to a virus that causes chickenpox or herpes zoster when infected.

The term "glycoprotein E (gE)", as used herein, refers to glycoprotein E present on a surface of VZV, and may be encoded by an ORF 68 region corresponding to a gE gene in the whole genome of human herpesvirus type 3 (HHV-3). For example, a wildtype gE protein may be composed of an amino acid sequence of NCBI Genbank Accession No. NP 040190.1, or may be composed of an amino acid sequence of SEQ ID NO: 5, and the 1st to the 30th amino acids in the amino acid sequence of SEQ ID NO: 5 may correspond to a signal peptide sequence.

The term "antigen", as used herein, refers to a compound, a composition, or a substance capable of stimulating production of antibodies and/or T cell responses in an animal, when injected, absorbed, or otherwise introduced thereto. The antigen includes all relevant antigenic epitopes. The term "epitope" or "antigenic determinant" refers to a site on an antigen to which B and/or T cells respond.

The gE antigen of VZV including the amino acid sequence of SEQ ID NO: 1 may be a recombinant protein which does not include an anchor region at the C-terminus, for example, the 547th to 623th amino acids in the amino acid sequence of SEQ ID NO: 5, unlike the wild-type gE antigen. For example, the gE antigen may be truncated such that the C-terminus region is removed from the wild-type gE antigen. The gE antigen of VZV comprising the amino acid sequence of SEQ ID NO: 1 may have an optimized signal peptide so that productivity may be improved. For example, the gE antigen may include a signal peptide sequence consisting of an amino acid sequence of SEQ ID NO: 6.

The gE antigen may further include an amino acid sequence of 'arginine-arginine-tryptophan-threonine-glycine-glycine-leucine-arginine (AAWTGGLA)' at the C-terminus of the amino acid sequence of SEQ ID NO: 1, or for example, may include an amino acid sequence of SEQ ID NO: 2.

The gE antigen may include an amino acid sequence showing at least 70%, at least 80%, at least 90%, at least 95%, at least 97%, at least 98%, or at least 99% identity with the amino acid sequence of SEQ ID NO: 1 or 2. In addition, it is obvious that as long as the amino acid sequence has the above sequence identity with the gE antigen and a biological activity substantially the same as or equivalent to that of the gE antigen, any variant having deletion, modification, substitution, or addition of a part of the sequence is within the scope of the present disclosure.

The gE antigen may be encoded by a polynucleotide comprising a nucleotide sequence of SEQ ID NO: 3 or 4. The polynucleotide may be codon-optimized, for example, codon-optimized so that it may be expressed well in CHO cells. The gE antigen may be encoded by a polynucleotide comprising a nucleotide sequence having 70% or more, 80% or more, 90% or more, 95% or more, 97% or more, 98% or more, or 99% or more identity with the nucleotide sequence of SEQ ID NO: 3 or 4, and having functionally equivalent to the polynucleotide comprising the nucleotide sequence of SEQ ID NO: 3 or 4.

The gE antigen may be a recombinant polypeptide or a polypeptide derived from VZV or proteins isolated therefrom. The gE antigen may be recombinantly prepared by using any suitable method known in the art. For example, a recombinant gE antigen may be obtained by desinging a nucleotide sequence encoding the gE antigen, preparing vectors containing the same, introducing the vectors into host cells to prepare microorganisms expressing the gE antigens, culturing the host cells, and isolating and purifying the gE antigens from the culture. A nucleotide sequence encoding the gE antigen may be, for example, the nucleotide sequence of SEQ ID NO: 3 or 4.

The gE antigen may be included in the vaccine composition in an amount of wt % to 10 wt %, 0.0001 wt % to 5 wt %, 0.0001 wt % to 1 wt %, 0.0001 wt % to 0.5 wt %, 0.0001 wt % to 0.1 wt %, 0.0001 wt % to 0.05 wt %, 0.001 wt % to 10 wt %, 0.001 wt % to 5 wt %, 0.001 wt % to 1 wt %, 0.001 wt % to 0.5 wt %, 0.001 wt % to 0.1 wt %, or 0.001 wt % to 0.05%, with respect to the total weight of the vaccine composition, but is not limited thereto.

The term "lipid A", as used herein, refers to a lipid consisting of two glucosamines (carbohydrates or sugars) and acyl chains linked thereto, generally with one phosphate group attached to each glucosamine. Lipid A may be tri-, tetra-, penta-, hexa-, or hepta-acylated, depending on the number of acyl chains. Four acyl chains directly attached to glucosamine may be beta hydroxyacyl chains of 10 to 16 carbons in length, and two additional acyl chains may be those mostly attached to beta hydroxy groups.

The term "monophosphoryl lipid A (MLA)", as used herein, may be used interchangeably with MPL, MPLA, MPL-A, or *Escherichia coli* MLA (EcML), and may refer to one in which only one of the two glucosamines of lipid A has a phosphate group attached thereto. The MLA may be tri-, tetra-, penta-, hexa-, or hepta-acylated depending on the number of acyl chains, and may be, for example, 1-dephosphorylated lipid A, 1-dephosphorylated-pentaacyl lipid A, 1-dephosphorylated-tetraacyl lipid A, or a combination thereof. The term "1-dephosphorylated lipid A" refers to one in which a phosphate group at position 1 in the structure of lipid A is removed and converted into a hydroxy group, which may be a kind of MLA and hexa-acylated, and the term may be used interchangeably with "1-dephosphorylated-hexaacyl lipid A" or "hexaacylated 1-dephosphorylated lipid A".

The MLA may not include a sugar moiety. The sugar moiety may be 2-keto-3-deoxy-D-manno-octulosonate (Kdo). The Kdo is a constituent of lipopolysaccharide (LPS) and is a conserved residue found in almost all LPSs.

The MLA may be present in the membranes of living bacteria, for example, outer membranes.

The MLA may be chemically synthesized or isolated from a strain producing MLA. A strain producing MLA may be, for example, wild-type or genetically engineered *Escherichia coli*, and may be a strain *E. coli* KHSC0055 disclosed in Korean Patent Registration No. 10-2019331.

The MLA may be included in an amount of 0.0001 wt % to 10 wt %, 0.0001 wt % to 5 wt %, 0.0001 wt % to 1 wt %, 0.0001 wt % to 0.5 wt %, 0.0001 wt % to 0.1 wt %, 0.0001 wt % to 0.05 wt %, 0.001 wt % to 10 wt %, 0.001 wt % to 5 wt %, 0.001 wt % to 1 wt %, 0.001 wt % to 0.5 wt %, 0.001 wt % to 0.1 wt %, or 0.001 wt % to 0.05 wt %, with respect to the total weight of the vaccine composition, but is not limited thereto.

A weight ratio of gE antigen:MLA included in the vaccine composition may be 1:0.1 to 1:10, 1:0.1 to 1:5, 1:0.1 to 1:4, 1:0.1 to 1:3, 1:0.2 to 1:10, 1:0.2 to 1:5, 1:0.2 to 1:4, or 1:0.2 to 1:3, but is not limited thereto.

A method of isolating MLA from an MLA-producing strain may include obtaining a lipid from the strain and then obtaining MLA from the obtained lipid. The method of obtaining lipid from the strain may be known in the art. For example, the method may include a physical or chemical method, the physical method may be, for example, ultrasonication or repeated freezing and thawing, and the chemical method may be extraction of lipids by using an organic solvent. The organic solvent may be, for example, chloroform, phenol, petroleum ether, dichloromethane, methanol, hexane, isopropyl alcohol, ethyl acetate, acetonitrile, ethanol, butanol, or a combination thereof. The method of extracting lipids may be, for example, the Bligh and Dyer extraction method (Bligh, E. G. and Dyer, W. J., Can. J. Biochem. Physiol., 1959, vol.37, p.911-917).

The obtaining of the MLA from the obtained lipid may not include removing a sugar moiety from the obtained lipid, and the sugar moiety may be Kdo. The obtaining of the MLA may be performed by chromatography. The chromatography may be an ion-exchange chromatography, a thin layer chromatography (TLC), a liquid chromatography (LC), or a combination thereof. The ion exchange chromatography may be an anion-exchange chromatography, or a cation-exchange chromatography. Resin of the ion exchange chromatography may be, for example, cellulose, Sephadex, or Sepharose. The resin of the ion exchange chromatography may contain a diethylaminoethyl (DEAE) group. The liquid chromatography may be high-performance liquid chromatography (HPLC). The chromatography may be a reversed-phase chromatography.

In an embodiment of the present disclosure, the vaccine composition may be a liposome formulation.

In an embodiment of the present disclosure, the vaccine composition may further include saponin.

In an embodiment of the present disclosure, the saponin in the vaccine composition may be QS-21.

In an embodiment of the present disclosure, the vaccine composition may include a cobalt-porphyrin-phospholipid (CoPoP) conjugate consisting of (i) a phospholipid; and (ii) a cobalt-porphyrin with porphyrins having cobalt coordinated thereto, and may be a liposome formulation.

In an embodiment of the present disclosure, the vaccine composition may further include a CoPoP conjugate and saponin, and may be a liposome formulation.

In an embodiment of the present disclosure, the saponin in the vaccine composition may be QS-21.

In an embodiment of the present disclosure, the vaccine composition may further include a CoPoP conjugate and QS-21, and may be a liposome formulation.

In an embodiment of the present disclosure, the gE antigen included in the vaccine composition, which further includes the CoPoP conjugate and is a liposome formulation, may be tagged with polyhistidine, and the polyhistidine may include 5 to 10 histidine residues. The polyhistidine may include, for example, 3 to 20, 3 to 16, 3 to 12, 3 to 8, 5 to 20, 5 to 16, 5 to 12, 5 to 8, 6 to 20, 6 to 16, 6 to 12, 6 to 10, or 6 to 8 histidine residues.

At least a portion of the polyhistidine is present in the hydrophobic portion of the monolayer or bilayer of the liposome, and at least one histidine residue of the polyhistidine forms a coordinate bond with cobalt of the cobalt-porphyrin so that at least a portion of the gE antigen is exposed to the exterior of the liposome.

The term “vaccine composition”, as used herein, may be used interchangeably with the term “immunogenic composition”. The vaccine composition refers to a composition of substances suitable (for example, in a lab environment) for administration to a human or animal subject capable of inducing a specific immune response against a pathogen (for example, VZV). The vaccine composition includes one or more antigens (for example, whole purified viruses or antigenic subunits, for example, polypeptides of viruses) or antigenic epitopes.

The vaccine composition may also include one or more additional components capable of inducing or enhancing an immune response, such as an excipient, carrier, and/or adjuvant. For example, the vaccine composition may further include an immune adjuvant such as magnesium hydroxide, aluminum hydroxide, aluminum phosphate, hydrated aluminum potassium sulfate (Alum), and QS-21, a kind of saponin.

The vaccine composition may be administered to a subject or a population of subjects to induce an immune response that protects the subject against a symptom or condition induced by a pathogen. The vaccine composition may be administered to prevent or treat (for example, to reduce or ameliorate) a symptom or disease caused by a pathogen, by inhibiting replication of the pathogen after exposure of a subject to the pathogen. The vaccine composition may be administered as an individual therapeutic agent or in combination with other therapeutic agents, or may be administered sequentially or simultaneously with other therapeutic agents.

In the vaccine composition, at least a portion of the gE antigen is exposed to the exterior of the liposome, thereby increasing the probability of the antigen to be absorbed by an antigen-presenting cell (APC), and accordingly, inducing high immunogenicity.

The porphyrin portion of the CoPoP conjugate may be a porphyrin, a porphyrin derivative, a porphyrin analog, or a combination thereof. Exemplary porphyrins may include hematoporphyrin, protoporphyrin, and tetraphenylporphyrin. Exemplary porphyrin derivatives may include pyropheophorbides, bacteriochlorophylls, chlorophyll A, benzoporphyrin derivatives, tetrahydroxyphenylchlorines, purpurins, benzochlorines, naphthochlorins, verdins, rhodins, ketochlorins, azachlorins, bacteriochlorins, triporphyrins, and benzobacteriochlorins. Exemplary porphyrin analogs may include expanded porphyrin family members (for example, texaphyrins, saphirins, and hexaphyrins) and porphyrin isomers (for example, porphycenes, inverted porphyrins, phthalocyanines, and naphthalocyanines). The cobalt-porphyrin may be, for example, vitamin B12 (cobalamin) or a derivative thereof.

The phospholipid of the CoPoP conjugate may refer to a lipid having a hydrophilic head with a phosphate group linked to a hydrophobic lipid tail via a glycerol backbone. The phospholipid may include an acyl side chain having 6 to 22 carbon atoms. The phospholipid may include, for example, 1-palmitoyl-2-hydroxy-sn-glycero-3-phosphocholine, phosphatidylcholine, phosphatidylethanolamine, phosphatidylserine, phosphatidylinositol, or a combination thereof, but is not limited thereto.

In the CoPoP conjugate, the porphyrin may be bound to the glycerol group of the phospholipid by a carbon chain linker having 1 to 20 carbon atoms.

Another aspect provides a method of preparing a vaccine composition comprising: culturing host cells transfected with an expression vector including a glycoprotein E (gE) antigen gene of VZV comprising a nucleotide sequence of SEQ ID NO: 3; and obtaining the gE antigen of VZV comprising an amino acid sequence of SEQ ID NO: 1 from the culture of the host cells.

The vaccine composition may be a vaccine composition including a gE antigen of VZV comprising the amino acid sequence of SEQ ID NO: 1; and MLA, and is as previously described.

The expression vector may comprise a nucleotide sequence of SEQ ID NO: 4. The term “vector”, as used herein, refers to a DNA construct containing a polynucleotide sequence encoding a protein of interest in a form operably linked to regulatory sequences suitable for expressing the protein of interest in a suitable host. The regulatory sequences may include a promoter capable of initiating transcription, an operator sequence for regulating such transcription, a sequence encoding a suitable mRNA ribosome binding site, and a sequence regulating termination of transcription and translation. After a vector is transfected into a suitable host cell, the vector may be replicated or function independently of the host genome, or may be integrated into the genome itself.

In the method of preparing the vaccine composition, the vector used is not particularly limited as long as it may be replicated in the host cell, and any vector known in the art may be used. Examples of commonly used vectors include naturally occurring or recombinant plasmids, cosmids, viruses, and bacteriophages. For example, pWE15, M13, λMBL3, λMBL4, λIXII, λASHII, λAPII, λt10, λt11, Charon4A, and Charon21A may be used as phage vectors or cosmid vectors, and pDZ vectors, pBR vectors, pUC vectors, pBluescriptII vectors, pGEM vectors, pTZ vectors, pCL vectors, and pET vectors may be used as plasmid vectors. Vectors that may be used in the method are not particularly limited, and expression vectors known in the art may be used.

The term “transfection”, as used herein, refers to a process of artificially making a genetic change by introducing an external gene into a a host so that the gene may be replicated as an episome or as part of the host genome by completion of chromosomal integration. Any transfection method may be used as the transfection method of the present disclosure, and the transfection may be readily conducted according to a conventional method in the art.

In addition, the term “operably linked”, as used herein may mean that a polynucleotide encoding a target protein of the present application is functionally linked to a promoter sequence that mediates initiation of the transcription of the polynucleotide.

The gE antigen may further include an amino acid sequence of 'arginine-arginine-tryptophan-threonine-glycine-glycine-leucine-arginine (AAWTGGLA)' at the C-terminus of the amino acid sequence of SEQ ID NO: 1, or for example, may include an amino acid sequence of SEQ ID NO: 2.

The host cell may be a CHO cell.

The culturing the transfected host cell may be conducted by employing types of culture medium, culturing temperatures, culturing conditions, etc. as known in the art. The culture medium may include antibiotics. The antibiotics may be, for example, kanamycin, ampicillin, chloramphenicol, or a combination thereof.

The term "culture", as used herein, refers to a product obtained after culturing the transfected host cells according to a known microbial culturing method, and the culture may include a culture supernatant or a cell lysate, and may or may not include cells.

In obtaining the gE antigen, the gE antigen may be obtained by a method of isolating and purifying proteins as commonly employed in the art. For example, the gE antigen may be separated and purified by using chromatography for the culture obtained from culturing of the host cells, but is not limited thereto. In an embodiment, recombinant gE antigens may be separated and purified by collecting the culture supernatant of the transfected host cells expressing the gE antigens and subjecting it to Q XL chromatography, butyl chromatography, $Ni^{2+}$ affinity chromatography, and an ultrafiltration (UF)/diafiltration (DF) process.

The gE antigen gene including the nucleotide sequence of SEQ ID NO: 3 is expressed in high yield by culturing the transformed host cells, thereby contributing to an increase in the production yield of the gE antigen and the vaccine composition including the same.

The method of preparing the vaccine composition may markedly increase the production yield of the vaccine composition by preparing a vaccine composition including the gE antigen of VZV including the amino acid sequence of SEQ ID NO: 1 or 2.

In an embodiment of the present disclosure, the vaccine composition may be a liposome formulation, and the method may further include preparing a liposome formulation including MLA by adding MLA to a composition for preparing liposomes including phospholipid and cholesterol.

In an embodiment of the present disclosure, the method may further include mixing the gE antigens and the liposome formulation including MLA, and mixing saponin and the liposomes mixed with the gE antigens.

In an embodiment of the present disclosure, the saponin to be mixed may be QS-21.

In an embodiment of the present disclosure, the method may further include mixing the gE antigens and the liposome formulation including MLA, and mixing QS-21 and the liposomes mixed with the gE antigens.

In an embodiment of the present disclosure, the preparing the liposome formulation may be preparing the liposome formulation including MLA and CoPoP by further adding CoPoP to the composition for preparing liposomes.

In an embodiment of the present disclosure, the method may further include binding the gE antigens to the liposome formulation by mixing the gE antigens and the liposome formulation including MLA and CoPoP, and mixing saponin and the gE antigen-bound liposomes.

In an embodiment of the present disclosure, the saponin to be mixed may be QS-21.

In an embodiment of the present disclosure, the method may further include binding the gE antigens to the liposome formulation by mixing the gE antigens and the liposome formulation including MLA and CoPoP, and mixing QS-21 and the gE antigen-bound liposomes.

In an embodiment of the present disclosure, the gE antigens and the liposome formulation may be mixed so that a weight ratio of the antigens and MLA in the liposomes is 1:0.1 to 10, 1:0.1 to 5, 1:0.1 to 4, 1:0.1 to 3, 1:0.2 to 10, 1:0.2 to 5, 1:0.2 to 4, or 1:0.2 to 3, but is not limited thereto.

In an embodiment of the present disclosure, the gE antigens and the liposome formulation may be mixed so that the weight ratio of the antigens and MLA in the liposomes is 1:1.

Another aspect provides a method of preventing or treating a disease caused by infection of Varicella Zoster virus (VZV), comprising administrating the vaccine composition to a subject that is expected to be infected with VZV or that have developed the disease caused by infection of VZV.

The vaccine composition is as described above.

The vaccine composition may be administered to a subject by a method known in the art. The vaccine composition may be administered directly to a subject by any means, for example, via an intravenous, intramuscular, or oral route.

The vaccine composition may be administered in a pharmaceutically effective amount. The term "pharmaceutically effective amount", as used herein, refers to an amount sufficient to lead to vaccine efficacy and not to cause side effects or serious or excessive immune reactions, and the effective amount may vary depending on various factors such as the disorder to be treated, severity of the disorder, activity of a specific compound to be used, route of administration, excretion rate of the vaccine composition, duration of treatment, drug used in combination or concurrently with the vaccine composition, age, weight, gender, diet, and general health of the subject, and other factors known in the pharmaceutical and medical art. Various general considerations in determining the pharmaceutically effective amount are known to those skilled in the art and are described, for example, in literatures [Gilman et al., eds., Goodman And Gilman's: The Pharmacological Bases of Therapeutics, 8th ed., Pergamon Press, 1990], and [Remington's Pharmaceutical Sciences, 17th ed., Mack Publishing Co., Easton, Pa., 1990]. The vaccine composition may be administered to a non-human animal in the same dose per kg as that to a human subject, or, for example, an amount calculated from the dose by applying the volume ratio (for example, average value) of an organ (such as heart) of an animal of interest and that of a human subject may be administered.

The subject may be a mammal, such as a human, mouse, rat, cow, horse, pig, dog, sheep, goat, cat, or an ape.

The term "prevention", as used herein, refers to any activity that suppresses or delays an onset of a disease caused by VZV infection by administering the vaccine composition of the present disclosure.

The term "treatment", as used herein, refers to any activity that improves or ameliorates the symptoms of a disease already caused by VZV infection by administering the vaccine composition of the present disclosure.

Advantageous Effects of Disclosure

A vaccine composition according to an aspect may significantly improve a production yield by including a gE antigen including an optimized signal peptide sequence, may enhance immunogenicity by including MLA, and may further enhance the immunogenicity enhanced by MLA by further adding saponin such as QS-21, and may be prepared in a form of CoPoP liposomes so that vaccine antigens may be presented on the surface of the liposomes, and thus may be better absorbed by antigen-presenting cells, and may maximiz vaccine efficacy by including the vaccine antigens and immune adjuvants in a formulation. Therefore, the vaccine composition may be useful as an alternative to current vaccines for prevention or treatment of a disease caused by VZV infection.

MODE OF DISCLOSURE

Hereinafter, the present disclosure will be described in more detail in Examples. However, Examples are intended only to illustrate at least one embodiment of the present disclosure, but not to limit the scope of the present disclosure thereto.

Example 1. Preparation of Monophosphoryl Lipid A

1.1. Culture of Strains Producing Monophosphoryl Lipid A

1.1.1. Preparation of Monophosphoryl Lipid A Producing Strain and Culture Medium Therefor As a strain producing monophosphoryl lipid A, *E. coli* KHSC0055 strain disclosed in Korean Patent Registration No. 10-2019331 was used. Culture of the strain was performed in a 30 L fermenter, and seed culture and main culture media were separately made. A medium comprising 16.0 g/L of peptone (BD Bioseciences), 10 g/L of yeast extract, and 5 g/L of NaCl was sterilized and used for a seed culture, and 100 μg/ml of ampicillin was added immediately before culturing the strain. A medium comprising 3.5 g/L of peptone (BD Bioseciences), 21.0 g/L of yeast extract, 6.0 g/L of $KH_2PO_4$, 5.0 g/L of $K_2HPO_4$, and 5.0 g/L of $NH_4Cl$ was sterilized and used for a main culture, and 40.0 g/L of glucose, and 10.0 g/L of $MgSO_4 \cdot 7H_2O$ were sterilized and aseptically added to the fermentor for main culture during the culturing of the strain.

1.1.2. Seed Culture

For primary seed culture, 200 ml of sterile seed culture medium was added to a 1 L Erlenmeyer flask. A seed vial of KHSC0055 was thawed, added to the flask, and incubated for about 18 hours to about 22 hours in a shaking incubator at about 31° C.

For secondary seed culture, 600 ml of sterile seed culture medium was added to each of six 2 L Erlenmeyer flasks, and 35 ml of the primary seed culture medium was inoculated. The culture was incubated for about 7 hours to about 12 hours in a shaking incubator at about 31° C.

1.1.3. Main Culture

Figure 1:
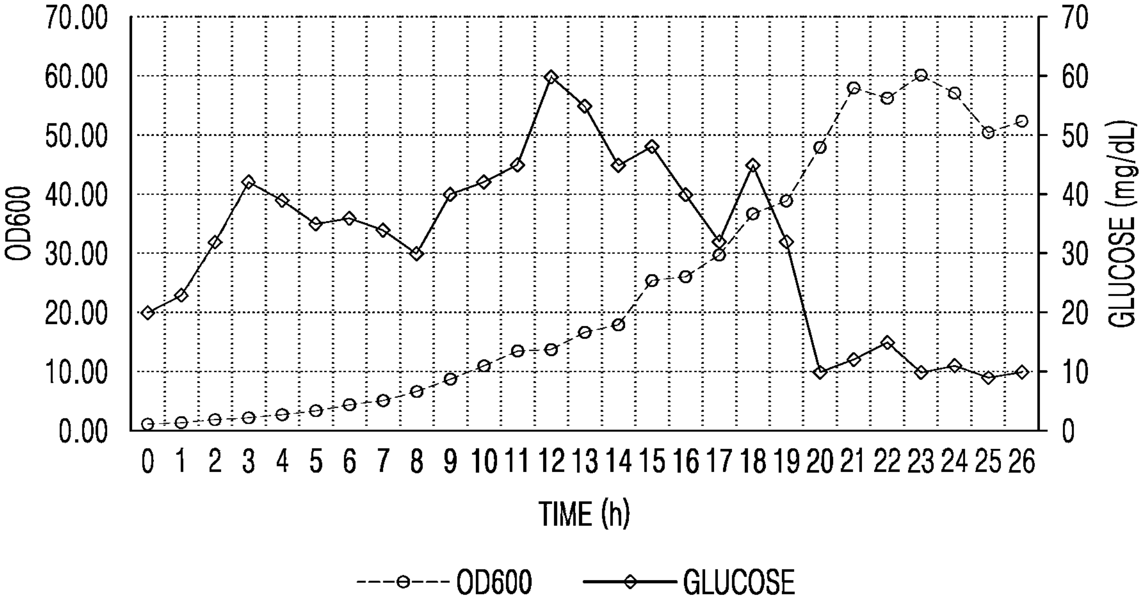
FIG. 1 is a graph showing a cell growth curve of a main culture of *E. coli* KHSC0055.

The main culture was cultured with an initial working volume of 18 L in a 30 L fermentor. The fermentor was filled with 18 L of the main culture medium and sterilized, and the glucose solution was separately sterilized and added to the fermentor aseptically during the culturing. The concentration of glucose in the culture medium was adjusted to be 1 g/L or less. pH of the medium was maintained at pH 6.7 by using $NH_4OH$. The secondary seed culture medium was inoculated into the medium in the fermentor, and the culture was incubated at about 31° C. with aeration of 3.0 Lpm, and dissolved oxygen (DO) adjusted to about 50%, while being stirred at about 300 rpm to about 400 rpm. The growth stage of the culture was monitored by measuring absorbance at 600 nm (FIG. 1).

The culture was harvested when the *E. coli* strain reached the death phase following the exponential phase and the stationary phase. The culture was filtered by either centrifugation or tangential flow filtration, washed with PBS, and then frozen.

1.2. Lipid Extraction and Thin Layer Chromatography (TLC) Analysis

The culture collected in Example 1.1 was centrifuged for about 20 minutes at room temperature to obtain *E. coli* only and 10 ml of the obtained *E. coli* was washed with 40 ml of PBS and then centrifuged again to obtain *E. coli* only. After washing twice, the *E. coli* was resuspended in 10 ml of PBS. 12.5 ml of methanol and 6.25 ml of chloroform were added to 5 ml of the resuspended *E. coli*, and the resulting mixture was incubated at room temperature for 1 hour while shaking. The incubated mixture was centrifuged at room temperature for about 30 minutes to obtain the supernatant. 6.25 ml of methanol and 6.25 ml of chloroform were added to the obtained supernatant, thoroughly mixed, and then the resulting mixture was centrifuged at room temperature for 20 minutes. The organic solvent layer was separated from the centrifuged mixture and dried in a nitrogen dryer to obtain lipid A and monophosphoryl lipid A. The obtained lipids were refrigerated.

Thin layer chromatography (TLC) was conducted for the obtained lipids. The total lipids obtained were diluted to 1 mg/ml by dissolving in 4:1 (v/v) chloroform:methanol, then 5 μl, 10 μl, or 15 μl was spotted on a 10×10 cm HPTLC plate (EMD Chemicals) and the plate was developed in a solvent of chloroform:methanol:water:ammonium hydroxide (28% (v/v) ammonia) mixed at a volume ratio of 40:25:4:2 (v/v). The developed plate was dried, visualized by spraying 10% (v/v) sulfuric acid (in ethanol), and heated on a hot plate at 300° C. to identify the bands.

Figure 2:
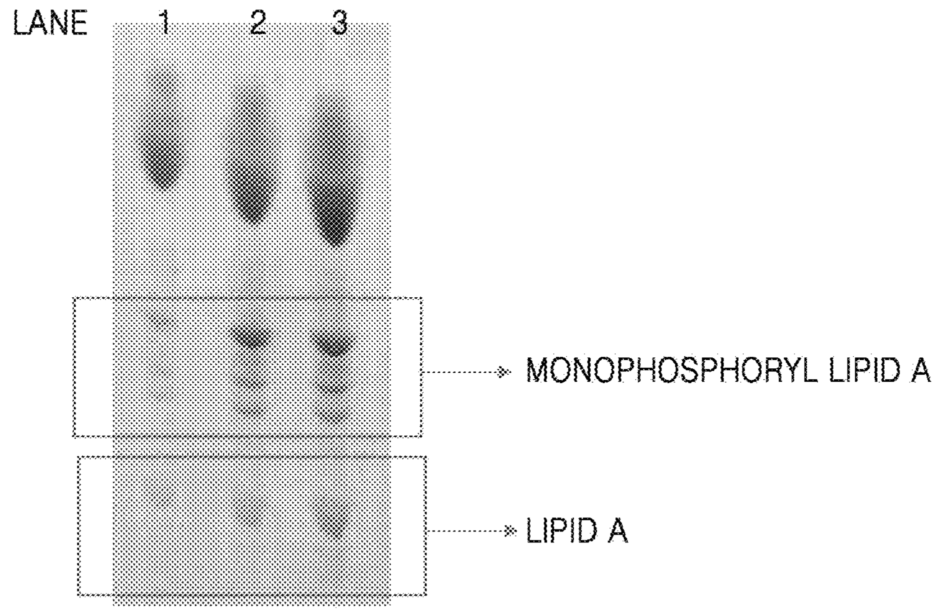
FIG. 2 is a photograph showing results of thin-layer chromatography (TLC) analysis of total lipids from the culture medium of *E. coli* KHSC0055 strain (Lanes 1, 2 and 3: 5 μl, 10 μl, and 15 μl of 1 mg/ml of the obtained lipid, respectively loaded).

As a result, as shown in FIG. 2, it was confirmed that the extracted lipids were a mixture of lipid A and monophosphoryl lipid A.

1.3. First Purification of Monophosphoryl Lipid A

Ion exchange chromatography was conducted to primarily purify monophosphoryl lipid A from the total lipids obtained in Example 1.2.

For ion exchange chromatography, Macro Prep DEAE (Bio-Rad Laboratories, Inc.) of a polymer substrate was used. Macro Prep DEAE is a weak anion exchange resin, and $-HN^+(C_2H_5)_2$ acts as a functional group. Since an organic solvent is used in the purification method, glass or stainless steel was used as the material of the column.

To obtain monophosphoryl lipid A only from a mixture of lipid A and monophosphoryl lipid A, the purification was conducted using an ammonium acetate gradient. A solution of chloroform:methanol:distilled water (2:3:1, v/v) was flowed in a 10 column volume (CV) or more to equilibrate the resin. 3 mg/mL of the lipid extract was loaded onto the equilibrated resin. The resin was washed with at least 20 CV of a solution of chloroform:methanol:distilled water (2:3:1, v/v) to ensure that impurities derived from *E. coli* were sufficiently wiped away and eluted.

Figure 3:
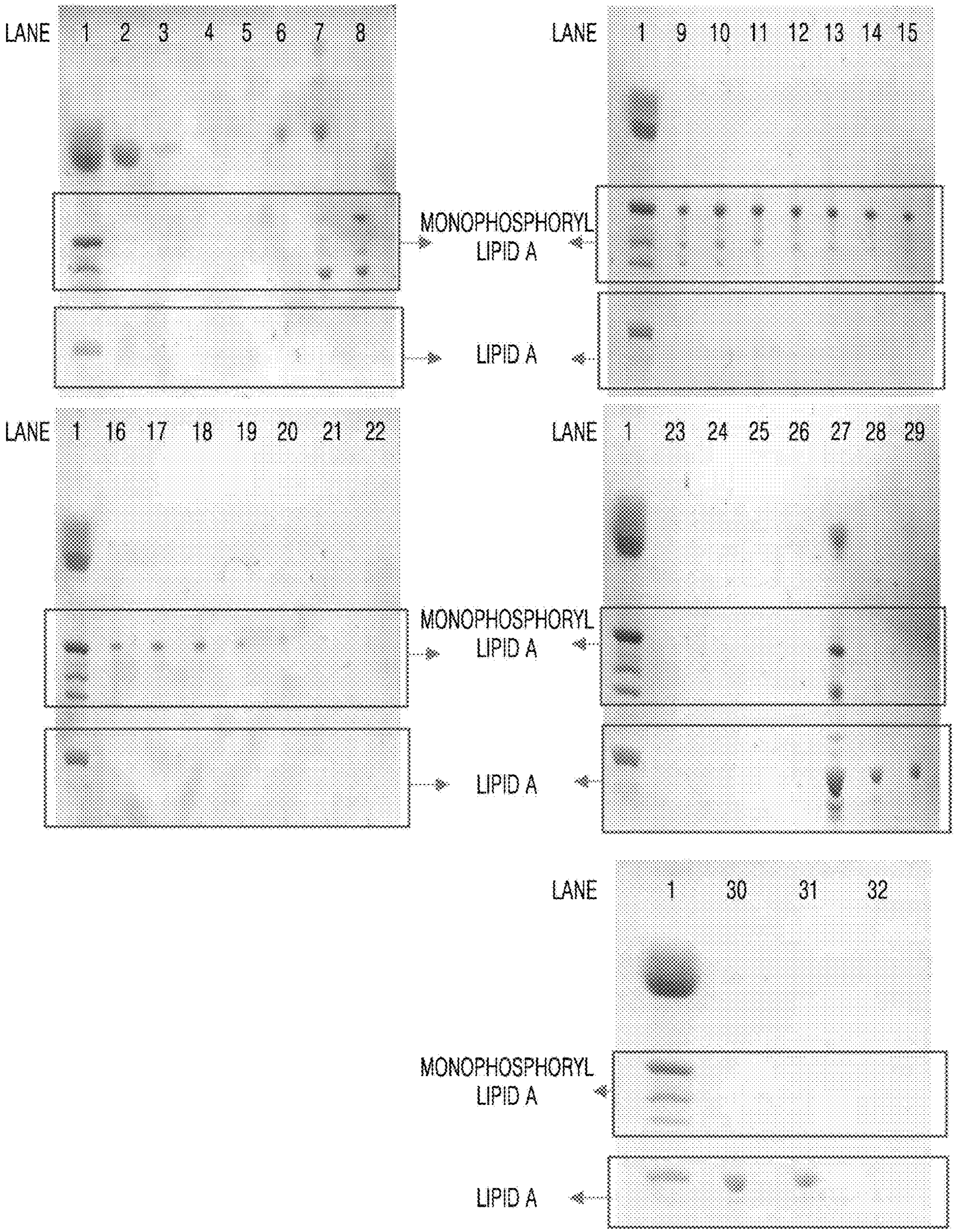
FIG. 3 is a photograph showing results of TLC analysis of eluates by salt concentration gradient obtained from ion exchange chromatography of total lipids for purification.

For elution of monophosphoryl lipid A, the elution was conducted by using a chloroform:methanol:5 mM to 50 mM salt (ammonium acetate) (2:3:1, v/v) concentration gradient. TLC analysis was conducted for each fraction eluted by 1 CV (FIG. 3). Based on the result of the TLC analyses, fractions in which only monophosphoryl lipid A was eluted were collected and pooled in a separatory funnel. To achieve buffer exchange and to enhance the stability of monophosphoryl lipid A, 10 ml of chloroform was added per 60 ml of the pooled solution, followed by addition of 0.1 N HCl solution. The final ratio of chloroform:methanol:distilled water was 2:2:1.8 (v/v). The separatory funnel was well shaken so that all solutions were evenly mixed, and then left until two layers are separated. When a phase change occurred from a single phase in which an aqueous solution layer was mixed with an organic solvent layer with dissolved monophosphoryl lipid A, to two phases in which the organic solvent and the aqueous solution layers were separated, only the organic solvent layer was isolated to obtain monophosphoryl lipid A. The resin was regenerated by treating it with high concentration (500 mM to 1 M) salt (ammonium acetate) to elute lipid A still bound thereto.

The results of TLC analysis for each eluent are shown in FIG. 3 (Lane 1: lipid sample before purification, Lanes 2 to 5: washing after loading lipid sample, Lanes 6 to 25: fractionation by 1 CV with salt concentration gradient (elution of monophosphoryl lipid A), and Lanes 26 to 32: washing with high concentration salt (elution of lipid A)).

As shown in FIG. 3, it was confirmed that monophosphoryl lipid A could be purified with high purity by ion exchange chromatography.

1.4. Determination of the Amount of Phosphate Groups in Lipid A and Monophosphoryl Lipid A Lipid A and monophosphoryl lipid A are different in the number of phosphate groups, lipid A having two molecules of phosphate groups, and monophosphoryl lipid A having one molecule of a phosphate group. Thus, 1 M of lipid A has 2 M of phosphate groups, and 1 M of monophosphoryl lipid A has 1 M of phosphate groups.

The lipids obtained from the strain KHSC0055 are a mixture of isomers due to the diversity in the number and location of the fatty acids attached to the backbone of lipid A. In order to measure the amount of phosphate groups in the obtained monophosphoryl lipid A, the following method was used.

Figure 4:
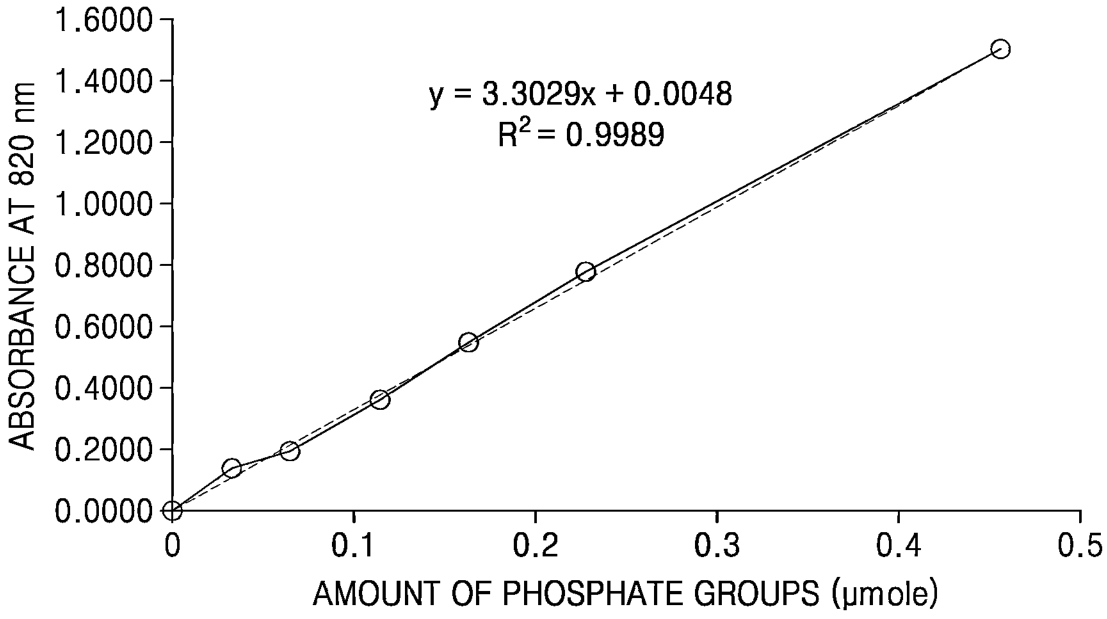
FIG. 4 is a standard curve for the amount of phosphate groups in the lipids.

A quantitative curve was prepared by using a 0.65 mM Phosphorus standard solution (Sigma cat. no. P3869). 0 μmole for a blank, 0.0325 μmole (50 μl), 0.065 μmole (100 μl), 0.114 μmole (175 μl), 0.163 μmole (250 μl), and 0.228 μmole (350 μl) of standard solution, respectively, were added to glass test tubes. 0.45 ml of 8.9 N $H_2SO_4$ was added to each test tube and the test tubes were incubated at 200° C. to 215° C. for 25 minutes. After cooling the heated glass test tubes at room temperature for 5 minutes, 150 μl of $H_2O_2$ was added to each test tube, followed by incubation at 200° C. to 215° C. for 30 minutes. After cooling the heated glass test tubes at room temperature, 3.9 ml of distilled water was added to each test tube and thoroughly stirred. 0.5 ml of 2.5% (w/v) ammonium molybdate (VI) tetrahydrate solution was added to each glass test tube and stirred sufficiently. 0.5 ml of 10% (w/v) ascorbic acid solution was added to each glass test tube, thoroughly stirred, and then incubated at 100° C. for 7 minutes with the lid of the glass test tube tightly closed to prevent vaporization of the liquid. After cooling the samples at room temperature, they were transferred to a 96-well plate. Absorbance was measured at 820 nm by using an enzyme-linked immunosorbent assay (ELISA) reader, and the standard curve for the amount of phosphate groups is shown in FIG. 4. The $R^2$ value of the standard curve is 0.9989, which means that the curve is reliable.

Amounts of phosphate groups in the total lipids before purification, and monophosphoryl lipid A and lipid A after purification were calculated by using the standard curve for the amount of phosphate groups. The calculated results are shown in Table 1.

TABLE 1

| Sample | Total lipids (before purification) | Monophosphoryl lipid A (After purification) | Lipid A (After purification) |
|---|---|---|---|
| Amount of phosphate groups (μmol/mg) | 0.91 | 0.55 | 1.09 |

As shown in Table 1, the amount of the phosphate groups in the total lipids before purification was 0.91 μmol/mg, the amount of the phosphate groups in monophosphoryl lipid A was 0.55 μmol/mg, and the amount of the phosphate groups in lipid A was 1.09 μmol/mg, twice that in the monophosphoryl lipid. Thus, it was confirmed that only monophosphoryl lipid A was obtained from the total lipids through purification.1.5.

Second Purification of Monophosphoryl Lipid A by Reverse Phase Chromatography

Following purification of monophosphoryl lipid A from lipid A through ion exchange chromatography, reverse phase chromatography was conducted to separate and purify the remaining phospholipid derived from *E. coli* and control levels of isoforms of monophosphoryl lipid A.

SMT bulk C8 resin (Separation Methods Technologies, Inc.) was used as a resin for separation and purification. The purification was conducted by varying polarity of the solvents, and the sample was ionized by using ammonium acetate. 2 L of mobile phase A was prepared by mixing 297 mL of chloroform, 1,485 mL of methanol, and 198 mL of distilled water, at a ratio of 15:75:10 (v/v), and 3.08 g of ammonium acetate was added to be included at 20 mM in the mobile phase A. 2 L of mobile phase B was prepared by mixing 297 mL of chloroform and 1,683 mL of methanol at a ratio of 15:85 (v/v), and 3.08 g of ammonium acetate was added to be included at 20 mM in the mobile phase B.

The resin was equilibrated by flowing 10 CV (column volume) or more of mobile phase A. A mixture sample of monophosphoryl lipid A and a small amount of phospholipid obtained through ion exchange chromatography in Example 1.3 was filtered through a 0.45 μm PTFE syringe filter and loaded onto the equilibrated resin. The concentration of the mixture was set to 3 mg/mL or less. Thereafter, in order to remove residual substances and phospholipid that could not bind to the resin, the resin was washed by flowing 20 CV or more of the mobile phase A.

Then, a concentration gradient was used for sequential elution of tetra-acylated, penta-acylated, and hexa-acylated monophosphoryl lipid A, which are isoforms of monophosphoryl lipid A. Mobile phase B was flowed through the resin, fractions eluted by 1 CV were collected, and a TLC analysis was performed for each fraction to remove the fractions in which phospholipid and 1-dephosphorylated-tetraacyl lipid A were eluted were excluded, and to collect only fractions in which 1-dephosphorylated-pentaacyl lipid A, and 1-dephosphorylated-lipid A were eluted. In the above process, given that when 1-dephosphorylated-lipid A is exposed to acidic pH for a long time, acyl chains in the molecule of 1-dephosphorylated-lipid A may be liberated, neutralization was conducted to improve stability and achieve buffer exchange.

Figure 5:
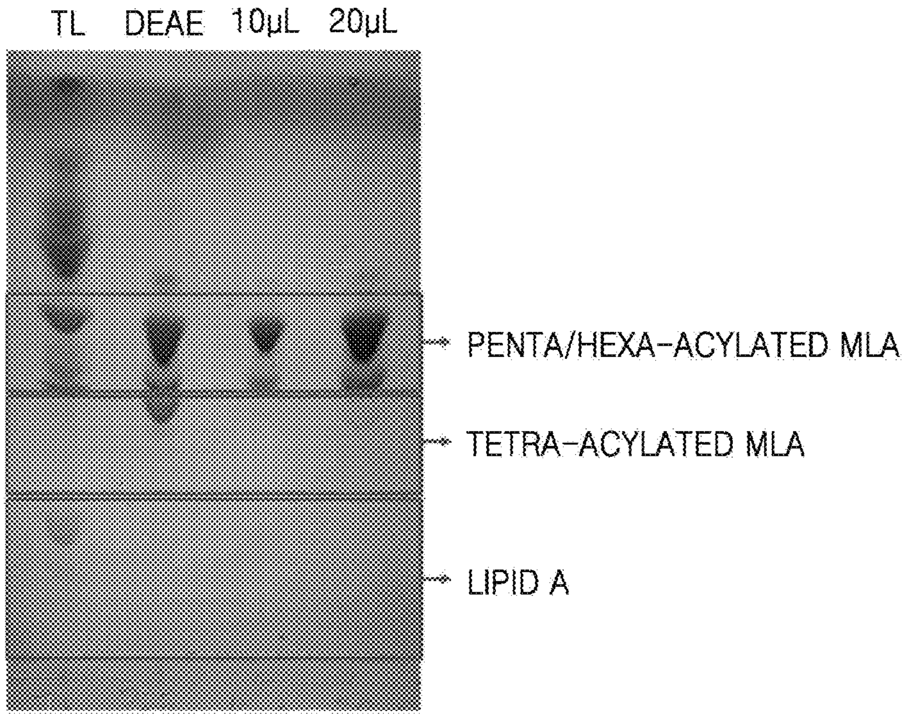
FIG. 5 is a photograph showing results of TLC analysis of a sample of the total lipid (TL) obtained from *E. coli* KHSC0055 strain, a sample from the first purification with diethylaminoethyl cellulose (DEAE), and a sample from the second CD8 resin based purification of DEAE-purified sample, 10 μl or 20 μl of each of 1 mg/mL loaded.

Volume of the fraction of 1-dephosphorylated-pentacyl lipid A and 1-dephosphorylated-lipid A was measured by using a glass mass cylinder and the fraction was transferred to a 2 L separatory funnel, and in order to phase-separate into an aqueous solution layer and an organic solvent layer, chloroform and distilled water were added to the fraction at a ratio of aqueous solution:methanol:chloroform=1.8:2:2 (v/v). Volumes of chloroform and distilled water to be added were calculated by using the formula, 'volume of the 1-dephosphorylated-pentacyl lipid A and 1-dephosphorylated-lipid A fraction X 0.65'. In addition, for neutralization of ammonium acetate in the mobile phase, 6 N of HCI was added dropwise, and the volume of 6 N HCI to be added was calculated by using the formula, 'volume of 1-dephosphorylated-pentacyl lipid A and 1-dephosphorylated-lipid A fraction X 0.02'. The separatory funnel was covered with a lid and shaken so that the solvents were well mixed, and then the lid was slightly opened to discharge the generated gas, and the mixture was left until separated into two layers. When the layer separation was completed, the lower organic solvent layer containing 1-dephosphorylated-pentaacyl lipid A and 1-dephosphorylated lipid A was collected, and a TLC analysis was conducted to confirm whether the separation was successful (FIG. 5).

Example 2. Production of Surface Glycoprotein E (gE) Antigen of Varicella Zoster Virus 2.1. Design of gE Antigen A gene of gE, which is a surface glycoprotein of VZV, was designed and produced in a form in which the C-terminal anchor domain in ORF 68 corresponding to the gE gene in the entire genome of Human herpesvirus type 3 (HHV-3) was removed. In addition, since gE protein is very lowely expressed in CHO cells, making it difficult to produce the protein as purified therefrom, the signal peptide of the gE protein was optimized to increase productivity.

Specifically, a gE was designed to include the optimized signal peptide sequence, instead of the signal peptide sequence of the 1st to 30th amino acids in the sequence of the 1st to 546th amino acids, which has been used as a vaccine antigen, in the amino acid sequence of SEQ ID NO: 5, which is the wild-type gE, and the 31th to the 546th amino acids (hereinafter referred to as "gEt"; a protein in which a histidine tag of 6 histidines is attached to the C-terminus of the gEt protein is referred to as "gEt-H6"). In addition, a gE was designed to include the optimized signal peptide sequence, instead of the signal peptide sequence of the 1st to 30th amino acids in the sequence of the 1st to 538th amino acids, which corresponds to a virion surface domain (VSD) for main functions of VZV, in the amino acid sequence of SEQ ID NO: 5 and the amino acid sequence from the 31th to 538th amino acids (hereinafter, referred to as "gEs"; a protein in which a histidine tag of 6 histidines is linked to the C-terminus of the gEs protein is referred to as "gEs-H6"). For the optimized signal peptide, signal peptides with high expression in CHO cells were screened and analyzed with SignalP 5.0 server. As a result, the amino acid sequence of SEQ ID NO: 6 suitable as a signal peptide sequence was selected and applied.

2.2. Construction of Cell Lines Producing gE Antigens

Each gene was amplified by PCR using the templates and primers in Table 2 below.

TABLE 2

| Gene name | PCR No. | Template | Forward primer sequence (5'→3') | Reverse primer sequence (5'→3') |
|---|---|---|---|---|
| $SP_{wt}$-gEt (1-546)-His tag | PCR1 | Codon-optimized nucleotide sequence | GCT AGC GCC GCC ACC ATG GGA ACT GTG AAC A | GCG GCC GCT TAT CAG TGG TGG TGG TGG TGG |

TABLE 2-continued

| Gene name | PCR No. | Template | Forward primer sequence (5'→3') | Reverse primer sequence (5'→3') |
|---|---|---|---|---|
| | | encoding gE antigen + nucleotide sequence encoding 6 histidines (SEQ ID NO: 7) | (SEQ ID NO: 8) | (SEQ ID NO: 9) |
| $SP_{wt}$-gEt (1-546) | PCR2 | Codon-optimized nucleotide sequence encoding gE antigen + nucleotide sequence encoding 6 histidines (SEQ ID NO: 7) | GCT AGC GCC GCC ACC ATG GGA ACT GTG AAC A (SEQ ID NO: 8) | GAA TTC tca tta TGC CAG ACC CCC TGT CCA AGC (SEQ ID NO: 10) |
| $SP_{wt}$-gEs (1-538)-His tag | PCR3 | Codon-optimized nucleotide sequence encoding gE antigen + nucleotide sequence encoding 6 histidines (SEQ ID NO: 7) | GCT AGC GCC GCC ACC ATG GGA ACT GTG AAC A (SEQ ID NO: 8) | GTA CCG GAT CAG AGG GGA GGT GCC TGG GTT (SEQ ID NO: 11) |
| | PCR4 | PCR3 product | GCT AGC GCC GCC ACC ATG GGA ACT GTG AAC (SEQ ID NO: 12) | GCG GCC GCT CAA TGG TGA TGG TGA TGA TGA TAA CGA ATC AGA GGG GAG G (SEQ ID NO: 13) |
| $SP_{mu}$-gEt (31-546)-His tag | PCR5 | PCR1 product | AGC GTG CTG CGC TAC GAC GAT (SEQ ID NO: 14) | GCG GCC GCT TAT CAG TGG TGG TGG TGG TGG (SEQ ID NO: 9) |
| | PCR6 | PCR5 product | AAG CTT GCC GCC ACC ATG AAG TGG GTG ACA TTT ATC TCT CTG CTT TTC CTG TTC AGC AGC GCC TAC AGT AGC GTG CTG CGC TAC GAC GAT (SEQ ID NO: 15) | GCG GCC GCT TAT CAG TGG TGG TGG TGG TGG (SEQ ID NO: 9) |
| $SP_{mu}$-gEt (31-546) | PCR7 | PCR6 product | AAG CTT GCC GCC ACC ATG AAG TGG GTG ACA (SEQ ID NO: 16) | GAA TTC tca tta TGC CAG ACC CCC TGT CCA AGC (SEQ ID NO: 17) |
| $SP_{mu}$-gEs (31-538)-His tag | PCR8 | PCR4 product | AGC GTG CTG CGC TAC GAC GAT (SEQ ID NO: 14) | GCG GCC GCT CAA TGG TGA TGG TGA TGA TGA TAA CGA ATC AGA GGG GAG G (SEQ ID NO: 13) |

TABLE 2-continued

| Gene name | PCR No. | Template | Forward primer sequence (5'→3') | Reverse primer sequence (5'→3') |
|---|---|---|---|---|
| | PCR9 | PCR8 product | AAG CTT GCC GCC ACC ATG AAG TGG GTG ACA TTT ATC TCT CTG CTT TTC CTG TTC AGC AGC GCC TAC AGT AGC GTG CTG CGC TAC GAC GAT (SEQ ID NO: 15) | GCG GCC GCT CAA TGG TGA TGG TGA TGA TGA TAA CGA ATC AGA GGG GAG G (SEQ ID NO: 13) |
| $SP_{mu}$-gEs (31-538) | PCR10 | PCR9 product | AAG CTT GCC GCC ACC ATG AAG TGG GTG ACA (SEQ ID NO: 16) | GAA TTC TCA TTA ATA ACG AAT CAG AGG GGA GGT (SEQ ID NO: 18) |

($SP_{wt}$: wild-type signal peptide; $SP_{mu}$: mutant signal peptide; gEt: truncated gE; gEs: virion surface domain (VSD) region of gE protein; and His tag: tag of 6 histidines)

Each amplified gene was TOPO-reacted with the pcDNA3.4 TOPO vector, and then transformed into an *E. coli* TOP10 strain. A single colony was isolated from the LB ampicillin plate, PCR amplified, the PCR product was cleaved with a restriction enzyme, and the sequence was confirmed by using the sequencing primers in Table 3 below (gEs gene: SEQ ID NO: 3, gEt gene: SEQ ID NO: 4).

TABLE 3

| Primer name | Sequence (5'→3') | SEQ ID NO: |
|---|---|---|
| CMV-F1 (vector) | CGC AAA TGG GCG GTA GGC GTG | 19 |
| VZV-F2-403 | CAG GCA TCC ACG TGA TCc caa | 20 |
| VZV-F3-1053 | TAT CAC AGC CAC GTG TTC TCC | 21 |
| VZV-R1~600 | CCATGTCTCGGTATACCT | 22 |
| VZV-R2~1200 | TGGGTGATACAGACAGG | 23 |
| VZV-R3 plus 150 (vector) | AGAGTGCCAG CCCTGGGA | 24 |

Figure 6:
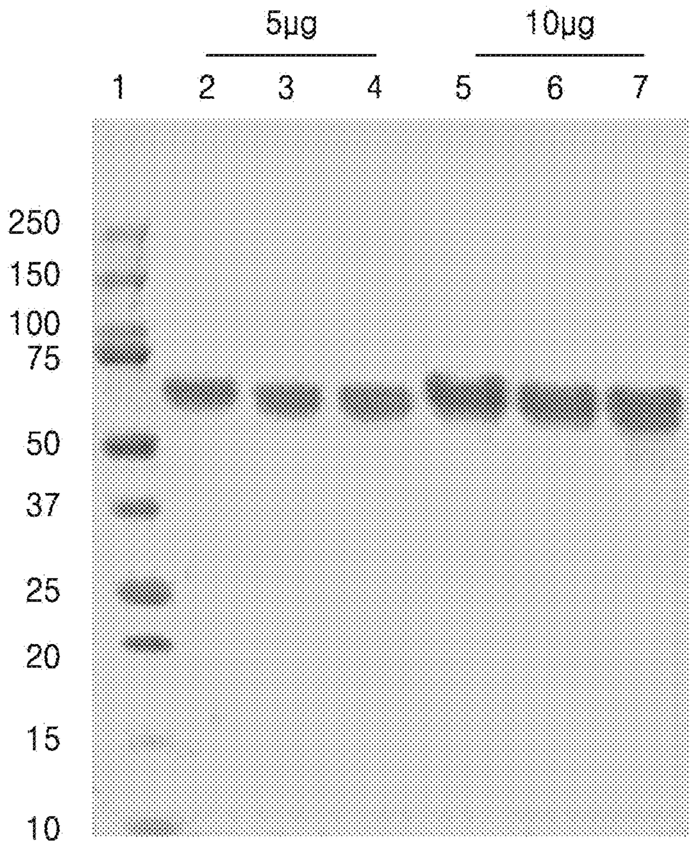
FIG. 6 is a photograph showing Western blot analysis ofexpression of gE antigens in cell lines producing gE antigens (Lane 1: size markers; Lane 2: 5 μg of gEt-H6 producing cell line; Lane 3: 5 μg of gEt producing cell line; Lane 4: 5 μg of gEs-H6 producing cell line; Lane 5: 10 μg of gEt-H6 producing cell line; Lane 6: 10 μg of gEt producing cell line; and Lane 7: 10 μg of gEs-H6 producing cell line).

Each plasmid DNA was isolated from the transformed strain and transiently transfected into ExpiCHO-S cells to prepare a cell line producing gE antigens. The transfection was conducted by using an ExpiCHO expression system (Thermo Fisher Scientific) according to the manufacturer's instructions, and on Day 14 of transfection, the cell culture supernatant was collected and subjected to electrophoresis and Western blotting to confirm the expression of each gE antigen. As a result, as shown in FIG. 6, each gE antigen was identified at about 70 kDa.

2.3. Purification of gE Antigen

After culturing each cell line producing gE antigens prepared in Example 2.2, the culture supernatant was collected, and primary Q XL chromatography, secondary butyl fast flow (FF) chromatography, tertiary $Ni^{2+}$ affinity chromatography, and a 10 k ultrafiltration (UF)/diafiltration (DF) were conducted to purify each recombinant gE antigen.

Specifically, the culture supernatant of each cell culture was collected, the pH was adjusted to 6, and then Q XL chromatography was conducted under the following conditions.

Column: Q XL Sepharose Hitrap 5 mL (Cytiva)
Flow rate: 5 mL/min
Equilibration buffer: 20 mM piperazine solution, pH 6
Wash buffer: 20 mM piperazine solution containing 150 mM NaCl, pH 6
Elution buffer: 20 mM piperazine solution containing 250 mM NaCl, pH 6

$(NH_4)_2SO_4$ was added to the eluted solution to make a final concentration of 1 M, pH was adjusted to 7.5, and then butyl FF chromatography was conducted under the following conditions.

Column: Butyl Sepharose Hitrap 5 mL (Cytiva)
Flow rate: 5 mL/min
Equilibration buffer: mixed solution of 50 mM of $KH_2PO_4$ and 1 M of $(NH_4)_2SO_4$, pH 7.5
Wash buffer: mixed solution of 50 mM of $KH_2PO_4$ and 100 mM of $(NH_4)_2SO_4$, pH 7.5
Elution buffer: mixed solution of 50 mM of $KH_2PO_4$ and 25 mM of $(NH_4)_2SO_4$, pH 7.5

NaCl was added to the eluted solution to make a final concentration of 0.5 M, pH was adjusted to 7.5, and then $Ni^{2+}$ affinity chromatography was conducted under the following conditions.

Column: $Ni^{2+}$ affinity Hitrap 5 mL (Cytiva)
Flow rate: 5 mL/min
Equilibration buffer: mixed solution of 50 mM of $KH_2PO_4$ and 0.5 M of NaCl, pH 7.5
Wash buffer: mixed solution of 50 mM of $KH_2PO_4$ and 0.5 M of NaCl, pH 5.6
Elution buffer: mixed solution of 50 mM of sodium acetate and 0.5 M of NaCl, pH 5

The eluted solution was neutralized by adding 1 M of Tris buffer at pH 9.5, and then 10 k UF/DF was conducted under the following conditions.

Ultrafiltration: 5 CV
Diafiltration buffer: 8.1 mM $Na_2HPO_4 \cdot 2H_2O$, 1.47 mM $KH_2PO_4$, 137 mM NaCl, 2.68 mM KCl, pH 7.2

The yield was confirmed by measuring the amount of proteins in each finally purified recombinant gE antigen by a protein quantification method of a bicinchoninic acid assay (BCA).

TABLE 4

| Signal peptide | gE antigen | Yield (mg/L medium) |
|---|---|---|
| Wild type (wt) | 1st to 546th amino acids of wild-type gE | — |
| | 1st to 546th amino acids of wild-type gE + tag of 6 histidines | — |
| Mutant | gEt (31-546) | 100 mg/L |
| | gEt-H6 (31-546) | 55 mg/L |
| | gEs-H6 (31-538) | 50 mg/L |

As a result, as shown in Table 4, the gE antigen having the wild-type signal peptide was not obtained as a purified antigen due to its low yield, but the gE antigen having the mutant signal peptide (SEQ ID NO: 6) was obtained with a yield of 50 mg/L to 100 mg/L, confirming that the yield was significantly improved.

Example 3. Preparation of Liposome Formulation Including Monophosphoryl Lipid A A liposome including monophosphoryl lipid A or a liposome formulation in which CoPoP is added thereto was prepared.

Specifically, 25 mg/mL of 1,2-dioleoyl-sn-glycero-3-phosphocholine (DOPC) solution, 10 mg/mL of cholesterol, 1 mg/mL of CoPoP (U.S. Pat. No. 10,272,160 B2), and 1 mg/mL of monophosphoryl lipid A solution were prepared by using chloroform as a solvent. The monophosphoryl lipid A was a purified monophosphoryl lipid A obtained as described in Example 1, including about 30% or less 1-dephosphorylated-pentacyl lipid A and about 70% or more 1-dephosphorylated lipid A. An ELS mixture was prepared by mixing 0.8 mL of DOPC, 0.5 mL of cholesterol, and 1 mL of monophosphoryl lipid A (MLA) as prepared above. An ECLS mixture was prepared by adding to the ELS mixture 1 mL of CoPoP as prepared above. The solvent was completely evaporated from the ELS mixture and the ECLS mixture by using a rotary vacuum evaporator to form a thin lipid film, PBS at pH 7.2 was added thereto, and then a first homogenization was conducted through re-hydration for 1 hour to 2 hours in a sonicator set at 60° C. For a second homogenization, an extruder or a microfluidizer was used to make the size of the final liposome formulation 200 nm or less. In this regard, the size of the liposome formulation was analyzed by an equipment using dynamic light scattering (DLS). Aseptic/bactericidal filtration was performed with a 0.2 μm PES syringe filter in a sterile field, and the filtered ELS liposomes and ECLS liposomes were refrigerated with the ECLS liposomes stored shielded from light. The amount of monophosphoryl lipid A in the prepared liposome formulation was quantified by using a high-performance liquid chromatography-charged aerosol detector (HPLC-CAD).

Example 4. Binding of Liposome Formulation and gE Antigens

Each of the gE antigens prepared in Example 2, gEt, gEt-H6, and gEs-H6, and each of ELS liposome and ECLS liposome prepared in Example 3 were mixed in a way to make the weight ratio of antigen:monophosphoryl lipid A 1:1, and then the ELS liposomes were kept refrigerated, and the ECLS liposomes were left at room temperature for 1 hour or more to bind the liposomes with the antigens, and then stored in a refrigerator.

Example 5. Efficacy of VZV Vaccine Composition

5.1. Test Group Setup and Drug Administration

Test groups were set up as follows: Test group 1 was administered with 1×PBS as a negative control group, Test group 2 was administered with Zostavax as a positive control group, Test groups 3 to 5 were administered with antigens only, Test groups 6 to 8 were administered with ELS, Test groups 9 and 10 were administered with ECLS, Test groups 11 to 13 were administered with ELSQ, and Test groups 14 and 15 were administered with ECLSQ, with each group consisting of five 6-week-old BALB/cAnNCrljOri (female) mice. Test group 1, the negative control group, was intramuscularly injected with 50 μl of 1×PBS per mouse in the thigh, and Test group 2, the positive control group, was subcutaneously injected with 26 μl of Zostavax (Merck, USA), as was calculated from the human dose, based on the weight of a mouse. Vaccine compositions used in the groups administered with ELSQ and ECLSQ were prepared by mixing QS-21 with ELS liposomes and ECLS liposomes mixed with or bound to each antigen as prepared in Example 4 above. Specifically, 1 mg/mL of QS-21 was prepared one day before administration, and QS-21 was mixed with the liposomes in the same amount as the monophosphoryl lipid A included in each liposome, and then the resulting mixture was diluted with PBS to prepare a vaccine composition, which was then shielded from light and refrigerated until use. As shown in Table 5 below, each drug administered to Test Groups 3 to 15 was intramuscularly injected in the thighs of the mice with the final volume of 1×PBS 50 μl, and all of the above administrations were performed twice at a 2-week interval.

TABLE 5

| Test group | Formulation | Binding antigen | Number of animals | Volume of administered solution (μl) | Dose (μg) Ag | Dose (μg) MLA | Dose (μg) QS-21 | Route of administration |
|---|---|---|---|---|---|---|---|---|
| 1 | PBS | — | 5 | 50 | — | — | — | Intramuscular injection |
| 2 | ZostaVax | — | 5 | 26 | — | — | — | Subcutaneous injection |
| 3 | Ag | gEt | 5 | 50 | 2 | — | — | Intramuscular injection |
| 4 | | gEt-H6 | 5 | 50 | 2 | — | — | |
| 5 | | gEs-H6 | 5 | 50 | 2 | — | — | |
| 6 | ELS | gEt | 5 | 50 | 2 | 2 | — | |
| 7 | | gEt-H6 | 5 | 50 | 2 | 2 | — | |
| 8 | | gEs-H6 | 5 | 50 | 2 | 2 | — | |

TABLE 5-continued

| Test group | Formulation | Binding antigen | Number of animals | Volume of administered solution (μl) | Dose (μg) Ag | MLA | QS-21 | Route of administration |
|---|---|---|---|---|---|---|---|---|
| 9 | ECLS | gEt-H6 | 5 | 50 | 2 | 2 | — | |
| 10 | | gEs-H6 | 5 | 50 | 2 | 2 | — | |
| 11 | ELSQ | gEt | 5 | 50 | 2 | 2 | 2 | |
| 12 | | gEt-H6 | 5 | 50 | 2 | 2 | 2 | |
| 13 | | gEs-H6 | 5 | 50 | 2 | 2 | 2 | |
| 14 | ECLSQ | gEt-H6 | 5 | 50 | 2 | 2 | 2 | |
| 15 | | gEs-H6 | 5 | 50 | 2 | 2 | 2 | |

5.2. Measurement of VZV Antigen Specific Serum Antibody Titer

After immunization, enzyme-linked immunosorbent assay (ELISA) was used to measure the VZV antigen specific antibody titer in the serum. Each of antigens, gEt, gEt-H6, and gEs-H6 diluted with PBS, was added at 1 μg/mL per well in a 96-well plate, sealed at 4° C. for one day for coating, and washed 3 times with PBS including 0.05% Tween 20. Mouse serum obtained before immunization, after a first immunization, and after a second immunization was serially diluted (2-fold dilution) by using PBS including 1% skim milk and 0.05% Tween 20, and then 100 μl of each of the dilutions was added to a 96-well plate coated with each antigen and sealed and incubated at room temperature for 2 hours. Thereafter, the plate was washed three times with PBS containing 0.05% Tween 20, and anti-mouse IgG-HRP was diluted 1:5000 with PBS containing 1% skim milk and 0.05% Tween 20, and 100 μl of the dilutions was added to each well, sealed and incubated in a light-shielded state at room temperature for 1 hour. After washing the plate 6 times with PBS containing 0.05% Tween 20, 100 μl of 3,3',5,5'-tetramethylbenzidine (TMB) substrate was added to each well for horseradish peroxidase (HRP) color development, and after 10 minutes of reaction, 100 μl of 0.5 M $H_2SO_4$ was added to each well to stop the reaction. After the reaction was completed, absorbance of the plate was measured at 450 nm to identify the final antibody titer of each group.

A cut-off value was calculated based on the results of mouse serum before immunization obtained by using the above experimental method to set a criterion for determining a test result as positive and negative based on the antibody titer obtained. The cut-off value was calculated by Equation 1 below:

Cut-off value=mean absorbance of mouse serum before immunization+2×standard deviation of absorbance of mouse serum before immunization. [Equation 1]

For the antibody titer calculated with mouse serum obtained after the first and second immunizations, the dilution factor corresponding to the measured absorbance higher than each cut-off value was determined as the final antibody titer. For example, when a cut-off value is 0.143, absorbance at $2^{14}$-fold dilution is 0.167, and absorbance at $2^{15}$-fold dilution is 0.124, $2^{14}$ becomes the final antibody titer of IgG. The results calculated by the above method were converted into log values by using an average and standard deviation for 5 mice per test group and shown.

Figure 7A:
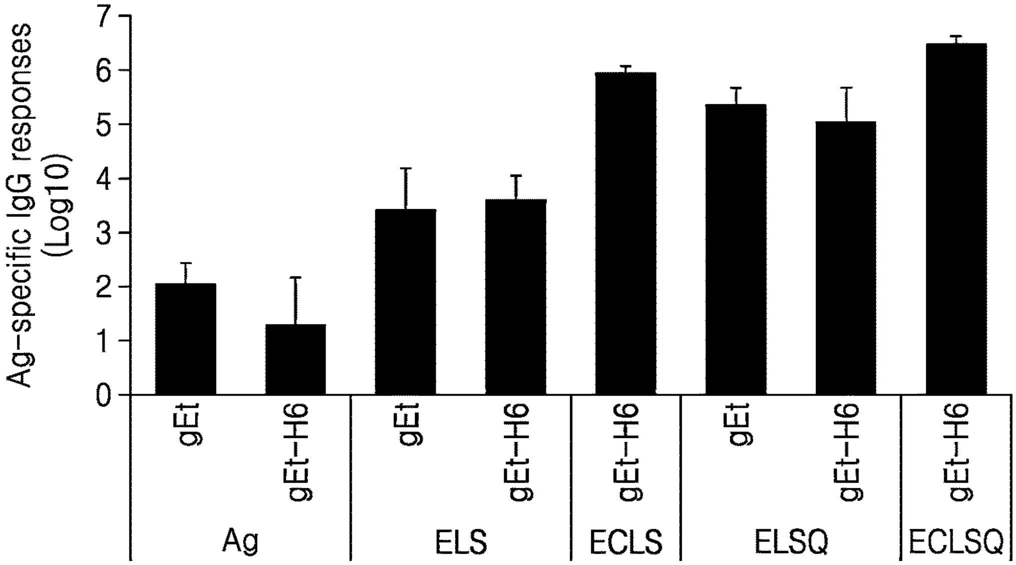
FIG. 7A is a graph showing comparison of effects of the gEt antigen and gEt-H6 antigen by measuring the titer of antibody formed after administration of the antigen, ELS, ECLS, ELSQ, or ECLSQ vaccine composition to mice.

As a result, as shown in FIG. 7A, compared to the test group administered with gEt-H6 antigens alone, about 1,000 times higher antibody titer was found in the ELS group administered with the vaccine composition in which monophosphoryl lipid A was conjugated to the gEt-H6 antigens in a form of liposomes, confirming the effect of monophosphoryl lipid A as an immune adjuvant. In addition, in the group administered with ELS, and in the group administered with ELSQ, antibody titers obtained with gEt as the antigen were found to be similar to those obtained with gEt-H6 as the antigen. In addition, when comparing the ELS-administered group and the ECLS-administered group, and the ELSQ-administered group and the ECLSQ-administered group for liposomes containing gEt-H6 antigens, the antibody titer increased by about 1,000-fold when administering a vaccine composition in the form of a liposome containing CoPoP, and therefore, it was confirmed that vaccine efficacy may be increased by adding CoPoP to enhance the ability to present antigen. In addition, although tECLSQ further includs QS-21 compared to ECLS, there was no significant difference in antibody titers between the ECLSQ administered group and the ECLS administered group.

Figure 7B:
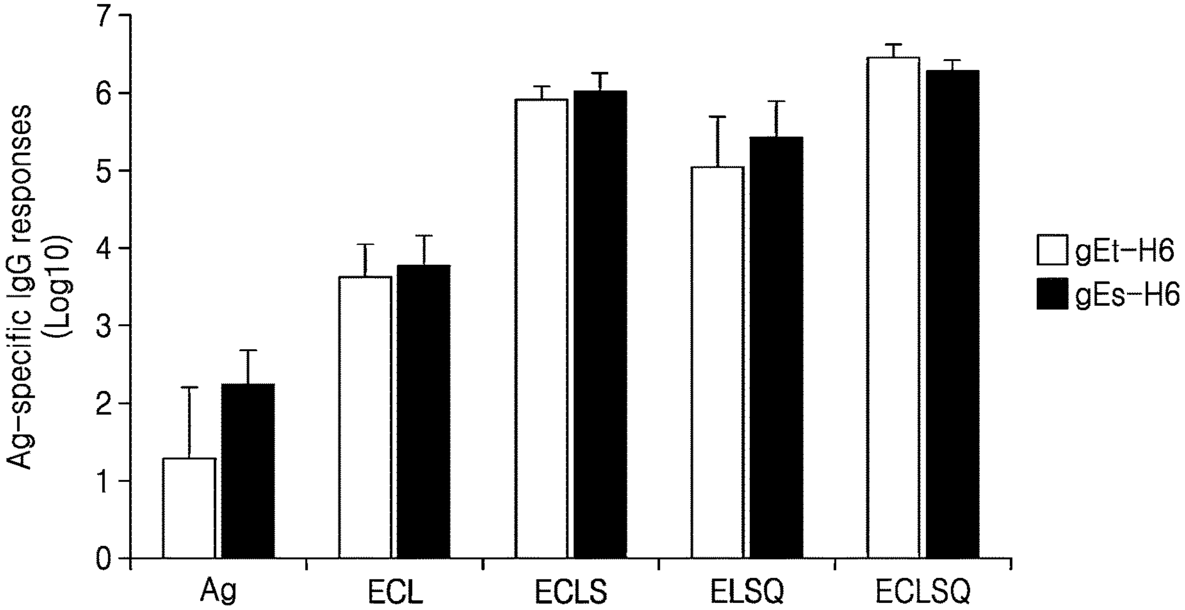
FIG. 7B is a graph showing results of comparison of effects of the gEt-H6 antigen and the gEs-H6 antigen after the same experiment as above.

As shown in FIG. 7B, when gEt-H6 antigen and gEs-H6 antigen were used respectively as antigen, the ELS, ECLS, ELSQ, and ECLSQ test groups showed significantly higher antibody titers compared to the groups administered with antigens only, and there was no difference in antibody formation efficacy between the two antigens.

Figure 7C:
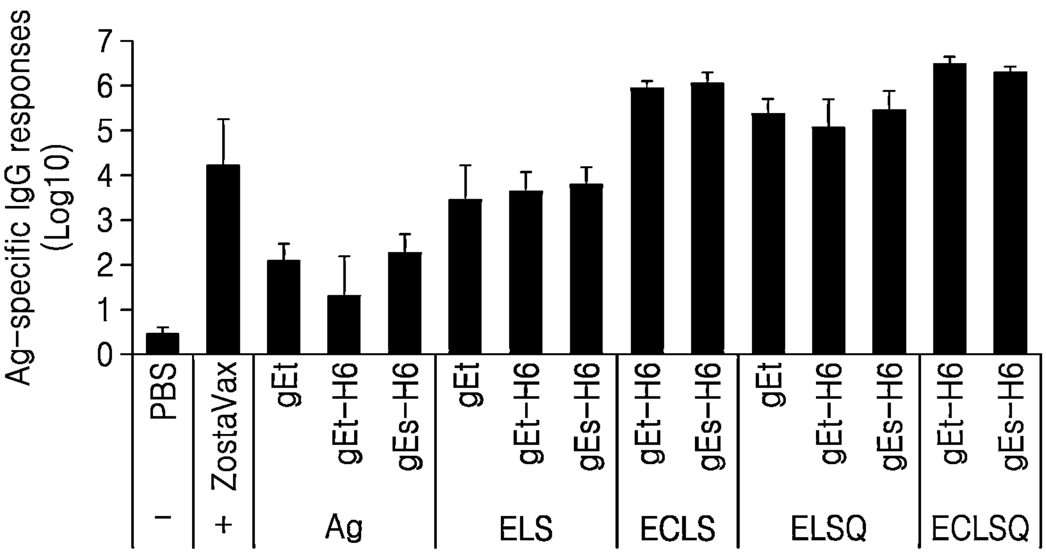
FIG. 7C is a graph showing results of the entire test groups after the same experiment as above.

As shown in FIG. 7C, when comparing all the test groups, the ECLS-administered group exhibited antibody formation efficacy at least about 100 times higher than that of Zostavax, a commercially available VZV vaccine, confirming that the addition of monophosphoryl lipid A and CoPoP is very effective in enhancinig formation of antibodies against VZV antigens.

5.3. Measurement of VZV Specific Cell-Mediated Immunity

In order to identify T cells specifically activated by VZV, the expression level of interferon gamma (IFN-gamma) was measured. Interferon gamma is a type of cytokine secreted by T cells that respond specifically to antigens and is used as a representative indicator when measuring cell-mediated immunity for antiviral activity.

First, after administering the vaccine composition as described in 5-1, 4 weeks after the second immunization of the VZV vaccine composition, two mice per group were sacrificed and the spleens were extracted. The spleen was placed on a 70 μm mesh, crushed by using a syringe plunger, and then washed with RPMI1640 medium. The spleen of each group was centrifuged at 500 xg for 5 minutes at 4° C., and RBC lysis buffer (0.083% ammonium chloride in 0.01 M of Tris buffer) was added to remove red blood cells. After centrifugation and final washing, the resulting pellet was resuspended in Complete RPMI1640 (10% FBS, 1% Antibiotics), and the splenocytes were counted, and $1\times10^6$ cells were added to each well in a U-shaped 96-well plate.

In order to activate T cells in an antigen-specific manner, the extracted splenocytes were restimulated with the peptides from gE antigens (Peptide), gE antigens (Protein), and VZV (Virus), respectively, as shown in Table 6, and the cells were cultured for 72 hours at 37° C. and 5% $CO_2$.

TABLE 6

| Description | Condition | | | |
|---|---|---|---|---|
| Primary cell | Splenocytes isolated from 2 mice per group | | | |
| Restimulation factor | Medium (control) | Peptide 2 μg/well | Protein 5 μg/mL | Virus 500 pfu/mL |
| Incubation time | 72 hours | | | |

Figure 8:
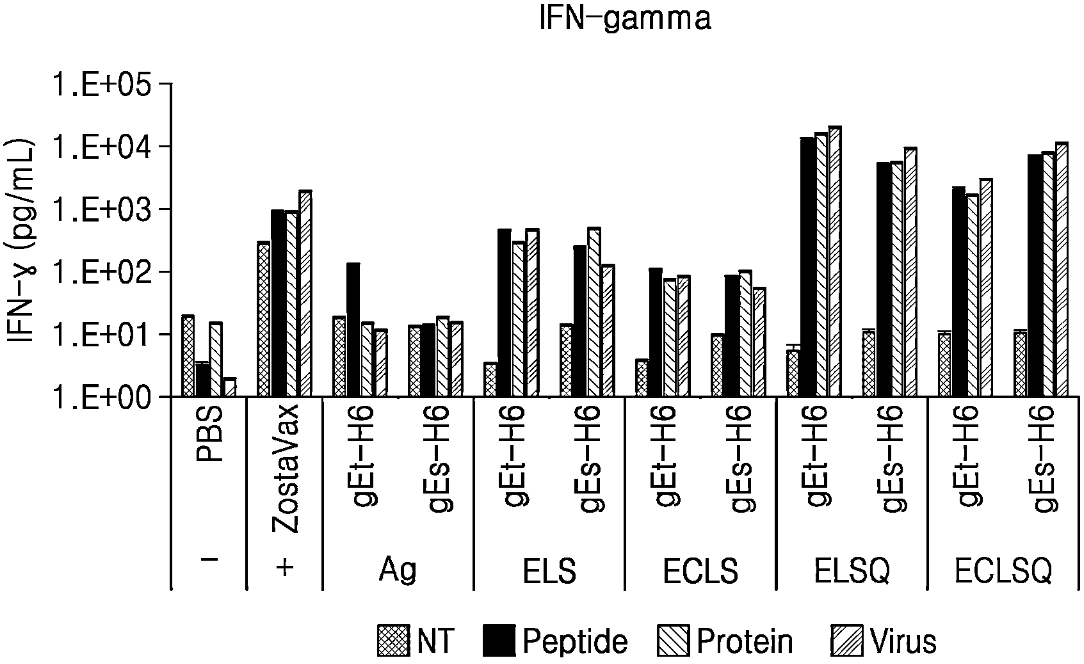
FIG. 8 is a graph showing results of quantifying cytokines secreted from cells restimulated in an antigen-specific manner by treating splenocytes of mice to which antigens, ELS, ECLS, ELSQ, or ECLSQ vaccine composition were administered, with gE peptides, gE proteins, or VZVs.

When the cultivation was completed, the resulting culture was centrifuged at 500 xg, and 4° C. for 5 minutes, and only the supernatant was collected to measure the cytokine secretion. The analysis was conducted by using Cytokine ELISA (R&D systems) according to the manufacturer's instructions to determine the amount of interferon gamma secretion in each group. As a result, as shown in FIG. 8, compared to the PBS group and the group administered with antigens only, in the groups to which an immune adjuvant, monophosphoryl lipid A as conjugated in the form of a liposome was added, when restimulated with substance related to Varicella Zoster antigens (Peptide, Protein, and Virus), the secretion of interferon gamma was found to be hundreds to thousands of times higher than that of the control group (media control: NT). In addition, there was no difference between gEt and gEs antigens in cell-mediated immunity as in the antibody titers. From the above, it was found that the gEs antigen containing only the VSD region of the gE antigen of VZV exhibited an effect equivalent to that of the gEt antigen which further contains the amino acid sequence present in the transmembrane at the C-terminus of the gE antigen. When CoPoP was added to the antigen, the specific antibody titer for the antigen was confirmed to be enhanced siginificantly be quite high, but cell-mediated immunity was almost similar to that before the addition, suggesting that the excellent antigen presenting ability of CoPoP would mainly promote differentiation of B cells. In the groups to which QS-21 was added together with monophosphoryl lipid A (ELSQ and ECLSQ), cell-mediated immunity was found to be about 10 times higher than that of Zostavax, the attenuated virus vaccine used as a reference drug. As a result, it was confirmed that both humoral and cellular immunity against the VZV antigen were found to be induced excellently by the VZV antigens in combination with monophosphoryl lipid A or CoPoP or QS-21, or a combination thereof.

The invention claimed is:

1. A vaccine composition comprising: glycoprotein E (gE) antigen of Varicella Zoster virus (VZV) comprising an amino acid sequence of SEQ ID NO: 1; and monophosphoryl lipid A (MLA).

2. The vaccine composition of claim 1, wherein the gE antigen comprises an amino acid sequence of SEQ ID NO: 2.

3. The vaccine composition of claim 1, wherein MLA comprises 1-dephosphorylated-lipid A, 1-dephosphorylated-pentaacyl lipid A, 1-dephosphorylated-tetraacyl lipid A, or a combination thereof.

4. The vaccine composition of claim 1, wherein the gE antigen is encoded by a polynucleotide comprising a nucleotide sequence of SEQ ID NO: 3 or 4.

5. The vaccine composition of claim 1, wherein the vaccine composition is a liposome formulation.

6. The vaccine composition of claim 5, further comprising saponin.

7. The vaccine composition of claim 5, further comprising a cobalt-porphyrin-phospholipid (CoPoP) conjugate consisting of (i) a phospholipid; and (ii) a cobalt-porphyrin with porphyrins having cobalt coordinated thereto, or a CoPoP conjugate and saponin.

8. The vaccine composition of claim 7, wherein the gE antigen is tagged with polyhistidine.

9. The vaccine composition of claim 8, wherein the polyhistidine comprises 5 to 10 histidine residues.

10. The vaccine composition of claim 9, wherein at least a portion of the polyhistidine is present in a hydrophobic portion of a monolayer or bilayer of the liposome, and at least one histidine residue of the polyhistidine forms a coordinate bond with cobalt of the cobalt-porphyrin, and at least a portion of the gE antigen is exposed to the exterior of the liposome.

11. A method of preparing a vaccine composition, the method comprising: culturing a host cell transfected with an expression vector including a glycoprotein E (gE) antigen gene of Varicella Zoster virus (VZV) comprising a nucleotide sequence of SEQ ID NO: 3; and obtaining the gE antigen of VZV comprising an amino acid sequence of SEQ ID NO: 1 from the culture of the host cell.

12. The method of claim 11, wherein the expression vector comprises a nucleotide sequence of SEQ ID NO: 4.

13. The method of claim 11, wherein the gE antigen comprises an amino acid sequence of SEQ ID NO: 2.

14. The method of claim 11, wherein the host cell is a CHO cell.

15. The method of claim 11, wherein the vaccine composition is a liposome formulation, and the method further comprises preparing a liposome formulation including MLA by adding MLA to a composition for preparing a liposome including phospholipid and cholesterol.

16. The method of claim 15, wherein the method further comprises mixing the gE antigen and the liposome formulation and then mixing saponin and the liposome formulation.

17. The method of claim 15, wherein MLA comprises 1-dephosphorylated lipid A, 1-dephosphorylated-pentaacyl lipid A, 1-dephosphorylated-tetraacyl lipid A, or a combination thereof.

18. The method of claim 15, wherein the preparing a liposome formulation comprises preparing a liposome formulation including MLA and CoPoP, by further adding CoPoP to the composition for preparing a liposome.

19. The method of claim 18, wherein the method further comprises binding the gE antigen to the liposome formulation by mixing the gE antigen with the liposome formulation, and mixing saponin with the gE antigen-bound liposome.

* * * * *